US012804688B2

(12) United States Patent
Li

(10) Patent No.: US 12,804,688 B2
(45) Date of Patent: Nov. 17, 2026

(54) METHOD AND APPARATUS FOR TRANSMISSION IN ACCESS PROCEDURE IN A WIRELESS COMMUNICATION SYSTEM

(71) Applicant: ASUS Technology Licensing Inc., Taipei City (TW)

(72) Inventor: Ming-Che Li, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/382,087

(22) Filed: Nov. 6, 2025

(65) Prior Publication Data

US 2026/0129661 A1 May 7, 2026

Related U.S. Application Data

(60) Provisional application No. 63/717,080, filed on Nov. 6, 2024.

(51) Int. Cl.
*H04W 72/40* (2023.01)
*H04W 4/70* (2018.01)
(Continued)

(52) U.S. Cl.
CPC ....... *H04W 72/40* (2023.01); *H04W 74/0833* (2013.01); *H04W 76/14* (2018.02)

(58) Field of Classification Search
CPC ....... H04W 8/245; H04W 4/203; H04W 4/30; H04W 4/70; H04W 4/80;
(Continued)

(56) References Cited

U.S. PATENT DOCUMENTS 11,382,140 B2 7/2022 Ye et al.
2018/0242355 A1* 8/2018 Lou ...................... H04W 74/08
(Continued)

OTHER PUBLICATIONS

Moderator (Apple); FL summary#1 on downlink and uplink channel/signal aspects; Agenda Item: 9.4.2.3; 3GPP TSG RAN WG1 #119; R1-240xxxx; Nov. 18-22, 2024; 89 pages.
(Continued)

*Primary Examiner* — San Htun
(74) *Attorney, Agent, or Firm* — Skaar Ulbrich Macari, P.A.

(57) ABSTRACT

Methods, systems, and apparatuses are provided for transmission in access procedures in a wireless communication system, wherein a method of a first device comprises receiving a first message, from a reader, for initiating a random access procedure, performing a first Device-to-Reader (D2R) transmission for Message 1 (Msg1), to the reader, for the random access procedure, wherein the first D2R transmission for Msg1 comprises a first Identity (ID), receiving a Message 2 (Msg2) message including multiple IDs, wherein the multiple IDs comprise at least the first ID, and wherein the Msg2 message includes a single size indication associated with the multiple IDs, deriving or determining a data packet size based on the single size indication in the Msg2 message; and performing a second D2R transmission in response to the Msg2 message, wherein the second D2R transmission comprises a data packet with the data packet size.

14 Claims, 10 Drawing Sheets

(51) Int. Cl.
*H04W 74/0833* (2024.01)
*H04W 76/14* (2018.01)
*H04W 76/16* (2018.01)

(58) Field of Classification Search
CPC ..... H04W 76/00–16; H04W 84/18–22; H04W 88/00–06; H04L 63/123; H04L 69/08
See application file for complete search history.

(56) References Cited

U.S. PATENT DOCUMENTS

| | | | | |
|---|---|---|---|---|
| 2019/0037447 | A1* | 1/2019 | Lee | H04W 74/0833 |
| 2021/0058947 | A1* | 2/2021 | Lin | H04W 72/04 |
| 2021/0076306 | A1* | 3/2021 | Tamura | H04W 12/08 |
| 2021/0319193 | A1* | 10/2021 | Elabd | G06K 19/0723 |
| 2021/0337601 | A1* | 10/2021 | Agiwal | H04B 17/327 |
| 2022/0210868 | A1* | 6/2022 | Park | H04W 28/0278 |
| 2023/0043517 | A1* | 2/2023 | Höglund | H04W 72/04 |
| 2024/0040625 | A1* | 2/2024 | Ji | H04W 74/0833 |
| 2025/0247277 | A1* | 7/2025 | MolavianJazi | H04L 27/02 |

OTHER PUBLICATIONS

Status Report to TSG; Agenda item: 9.2.2; 3GPP TSG RAN Meeting #106; RP-24XXXX; Dec. 9-12, 2024; 119 pages.

* cited by examiner

METHOD AND APPARATUS FOR TRANSMISSION IN ACCESS PROCEDURE IN A WIRELESS COMMUNICATION SYSTEM

CROSS-REFERENCE TO RELATED APPLICATIONS

The present application claims priority to and the benefit of U.S. Provisional Patent Application Ser. No. 63/717,080, filed Nov. 6, 2024, which is hereby fully incorporated herein by reference.

FIELD

This disclosure generally relates to wireless communication networks and, more particularly, to a method and apparatus for transmission in access procedures in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided transmission in access procedures in a wireless communication system. As such, considering ultra-low complexity and power consumption of Ambient Internet of Things (IoT) devices, this shortens time duration for Message 2 (Msg2) monitoring, for Msg2 reception, and handles scheduling of Message 3 (Msg3) sizes and resources.

In various embodiments, a method for a first device in a wireless communication system comprises receiving a first message, from a reader, for initiating a random access procedure, performing a first Device-to-Reader (D2R) transmission for Message 1 (Msg1), to the reader, for the random access procedure, wherein the first D2R transmission for Msg1 comprises a first Identity (ID), receiving a Msg2 message including multiple IDs, wherein the multiple IDs comprise at least the first ID, and wherein the Msg2 message includes a single size indication associated with the multiple IDs, deriving or determining a data packet size based on the single size indication in the Msg2 message; and performing a second D2R transmission in response to the Msg2 message, wherein the second D2R transmission comprises a data packet with the data packet size.

In various embodiments, a method for a reader in a wireless communication system comprises transmitting a first message for initiating a random access procedure, receiving multiple D2R transmissions for Msg1 for the random access procedure, wherein the multiple D2R transmissions for Msg1 comprise a first D2R transmission for Msg1 from a first device, obtaining or receiving multiple IDs from the multiple D2R transmissions for Msg1, wherein the multiple IDs comprise at least a first ID in the first D2R transmission for Msg1, transmitting a Msg2 message including the multiple IDs, wherein the Msg2 message includes a single size indication, for a data packet size, associated with the multiple IDs, and receiving at least a second D2R transmission from the first device, wherein the second D2R transmission comprises a data packet with the data packet size

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-240826, "Revised SID: Study on solutions for Ambient IoT (Internet of Things) in NR"; [2]R1-2401937, "Final Report of 3GPP TSG RAN WG1 #116 v1.0.0 (Athens, Greece, Feb. 26th-Mar. 1, 2024)"; [3]R1-2403821, "Final Report of 3GPP TSG RAN WG1 #116b v1.0.0 (Changsha, China, Apr. 15th-19th, 2024)"; [4] RAN1 Chair's Notes for 3GPP TSG RAN WG1 #117 (Fukuoka City, Fukuoka, Japan, May 20th-24th, 2024); [5] RAN1 Chair's Notes for 3GPP TSG RAN WG1 #118 (Maastricht, NL, Aug. 19th-23rd, 2024); [6] RAN1 Chair's Notes for 3GPP TSG RAN WG1 #118bis (Hefei, China, Oct. 14th-18th, 2024); [7] RAN2 Chair's Notes for 3GPP TSG RAN WG2 #126 (Fukuoka City, Fukuoka, Japan, May 20th-24th, 2024); [8] RAN2 Chair's Notes for 3GPP TSG RAN WG 2 #127 (Maastricht, NL, Aug. 19th-23rd, 2024); [9]R1-2407863, "Discussion on Frame structure, random access, scheduling and timing aspects for Ambient IoT", vivo; and [10] R1-2407907, "Discussion on frame structure and timing aspects for A-IoT", CMCC. The standards and documents listed above are hereby expressly and fully incorporated herein by reference in their entirety.

Figure 1:
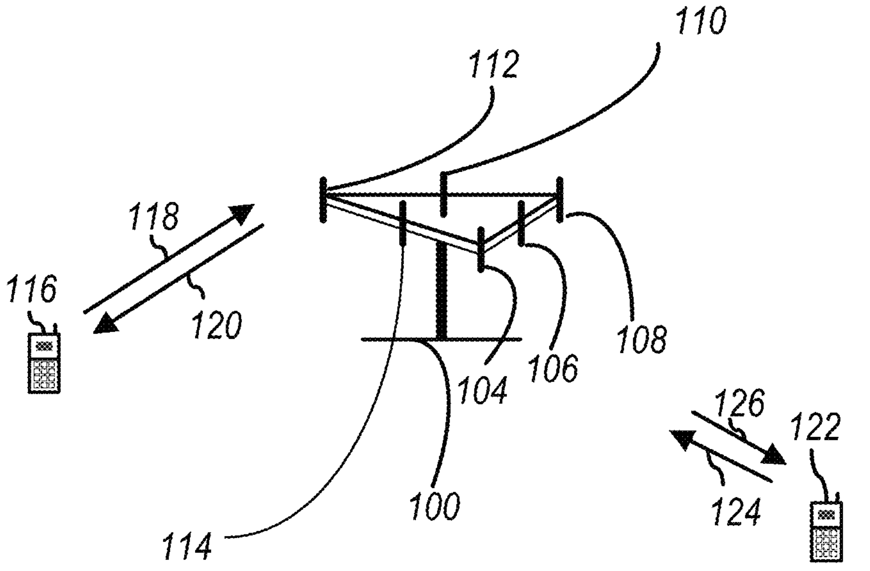
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
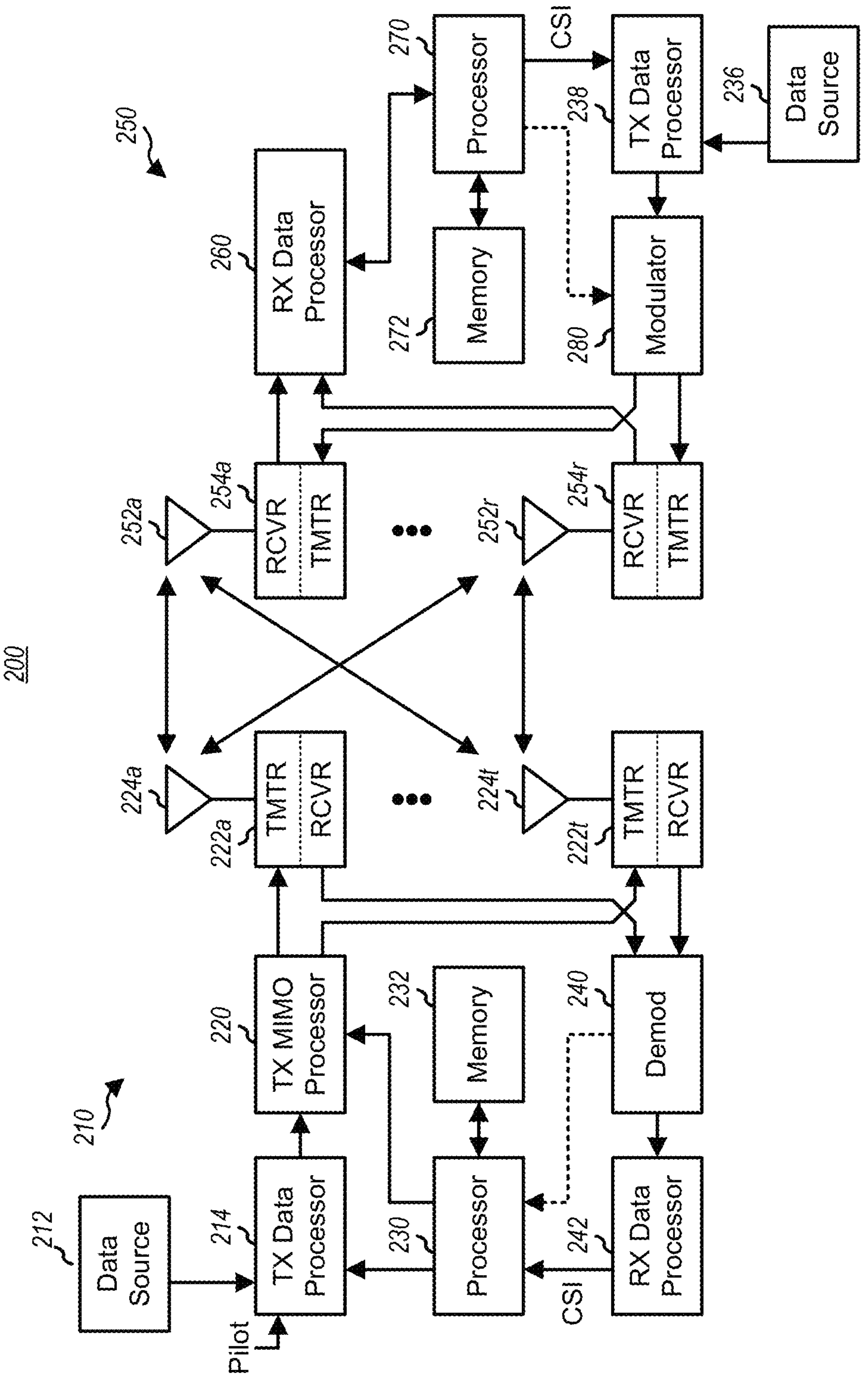
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$"detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
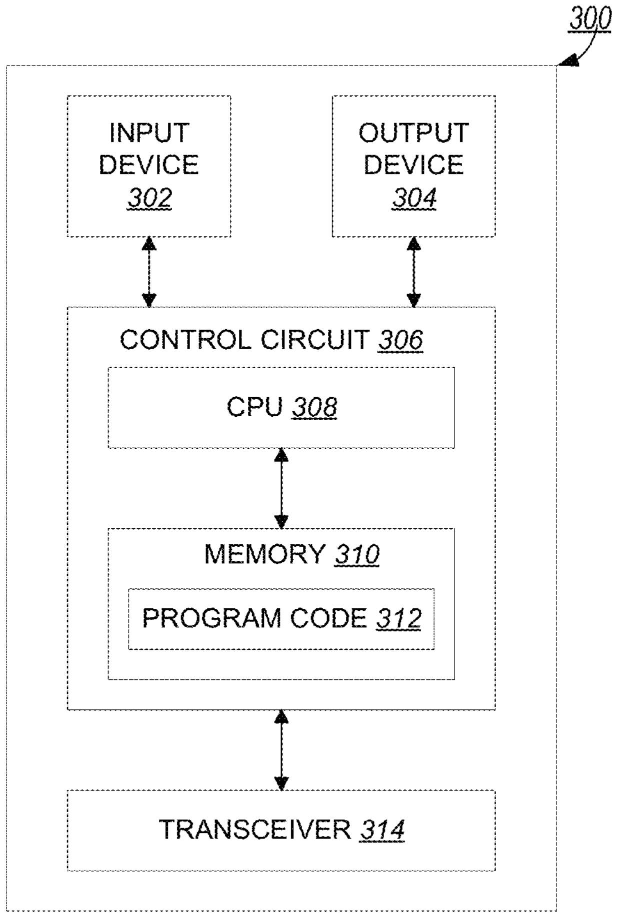
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
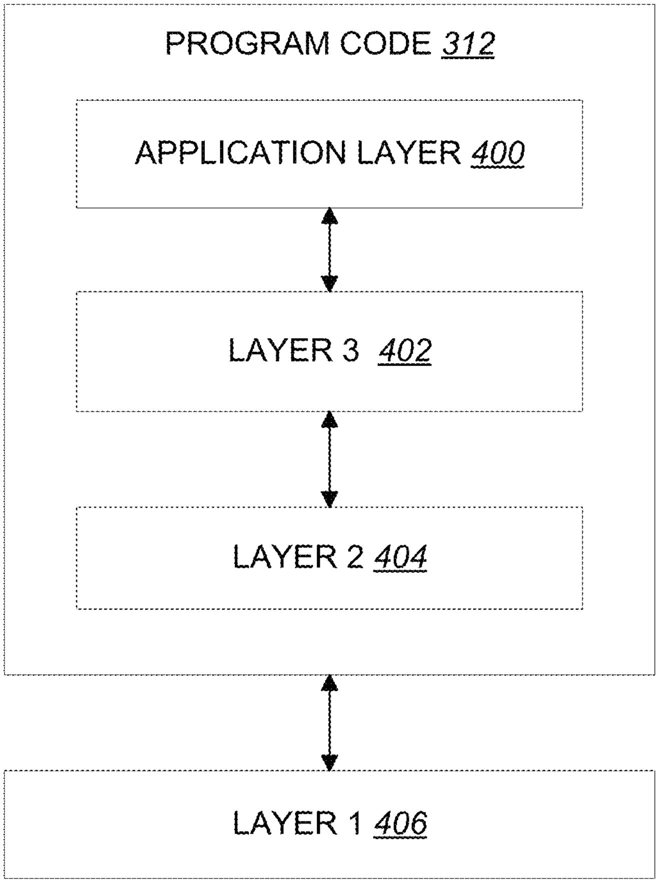
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

The study item of Ambient Internet of Things (IoT) is specified in [1] RP-240826, as below:

**************************QUOTATION [1] START*******************************

3 Justification

In recent years, IoT has attracted much attention in the wireless communication world. More 'things' are expected to be interconnected for improving productivity efficiency and increasing comforts of life. Further reduction of size, complexity, and power consumption of IoT devices can enable the deployment of tens or even hundreds of billion IoT devices for various applications and provide added value across the entire value chain. It is impossible to power all the IoT devices by battery that needs to be replaced or recharged manually, which leads to high maintenance cost, serious environmental issues, and even safety hazards for some use cases (e.g., wireless sensor in electric power and petroleum industry).

Most of the existing wireless communication devices are powered by battery that needs to be replaced or recharged manually. The automation and digitalization of various industries open numbers of new markets requiring new IoT technologies of supporting battery less devices with no energy storage capability or devices with energy storage that do not need to be replaced or recharged manually. The form factor of such devices must be reasonably small to convey the validity of target use cases.

TR 22.840 is being developed by SA1 to capture use cases, traffic scenarios, device constraints of ambient power-enabled Internet of Things and identify new potential service requirements as well as new KPIs. SA1 are considering devices being either battery-less or with limited energy storage capability (i.e., using a capacitor) and the energy is provided through the harvesting of radio waves, light, motion, heat, or any other power source that could be seen suitable.

Considering the limited size and complexity required by practical applications for battery less devices with no energy storage capability or devices with limited energy storage that do not need to be replaced or recharged manually, the output power of energy harvester is typically from 1 μW to a few hundreds of μW. Existing cellular devices may not work well with energy harvesting due to their peak power consumption of higher than 10 mW.

An example type of application in TR 22.840 is asset identification, which presently has to resort mainly to barcode and RFID in most industries. The main advantage of these two technologies is the ultra-low complexity and small form factor of the tags. However, the limited reading range of a few meters usually requires handheld scanning which leads to labor intensive and time-consuming operations, or RFID portals/gates which leads to costly deployments. Moreover, the lack of interference management scheme results in severe interference between RFID readers and capacity problems, especially in case of dense deployment. It is hard to support large-scale network with seamless coverage for RFID.

TSG RAN has completed a Rel-18 RAN-level SI on Ambient IoT, which provides a terminological and scoping framework for future discussions of Ambient IoT. This has defined representative use cases, deployment scenarios, connectivity topologies, Ambient IoT devices, design targets, and required functionalities; it also conducted a preliminary feasibility assessment, and gave recommendations for down-selection in setting the scope of a further WG-level study.

Since existing technologies cannot meet all the requirements of target use cases, a new IoT technology is recommended to open new markets within 3GPP systems, whose number of connections and/or device density can be orders of magnitude higher than existing 3GPP IoT technologies. The new IoT technology shall provide complexity and power consumption orders of magnitude lower than the existing 3GPP LPWA technologies (e.g. NB-IoT and eMTC), and shall address use cases and scenarios that cannot otherwise be fulfilled based on existing 3GPP LPWA IoT technologies.

4 Objective 4.1 Objective of SI or Core part WI or Testing part WI

This study targets a further assessment at RAN WG-level of Ambient IoT, a new 3GPP IoT technology, suitable for deployment in a 3GPP system, which relies on ultra-low complexity devices with ultra-low power consumption for the very-low end IoT applications. The study shall provide clear differentiation, i.e. addressing use cases and scenarios that cannot otherwise be fulfilled based on existing 3GPP LPWA IoT technology e.g. NB-IoT including with reduced peak Tx power.

General Scope

The definitions provided in TR 38.848 are taken into this SI, and the following are the exclusive general scope:

A. The overall objective shall be to study a harmonized air interface design with minimized differences (where necessary) for Ambient IoT to enable the following devices:
   - i. ~1 μW peak power consumption, has energy storage, initial sampling frequency offset (SFO) up to 10' ppm, neither DL nor UL amplification in the device. The device's UL transmission is backscattered on a carrier wave provided externally.
   - ii. ≤a few hundred μW peak power consumption[1], has energy storage, initial sampling frequency offset (SFO) up to $10^X$ ppm,DL and/or UL amplification in the device. The device's UL transmission may be generated internally by the device, or be backscattered on a carrier wave provided externally.
   - X is to be decided in WGs.
   - Coverage design target: Maximum distance of 10-50 m with device indoors as per TR 38.848: " . . . a range that WGs can sub-select within".
   - For Topologies 1 & 2 (UE as intermediate node under NW control) per TR 38.848, with no RRC states, no mobility (i.e. at least no cell selection/re-selection-like function), no HARQ, no ARQ.

NOTE 1: It is to be understood that "≤a few hundred μW" means WGs are not tasked with setting a particular value, and that it will be for WG discussions to determine if a presented design with corresponding power consumption satisfies the "≤a few hundred μW" requirement.

B. . . .

The following objectives are set, within the General Scope:

1. . . .
2. Study necessary and feasible solutions for Ambient IoT as prescribed in the General Scope, including decisions on which functions, procedures, etc. are needed and not needed, and ensuring at least the required functionalities in Section 6.2 of TR 38.848.

. . .

RAN1-led:
- For the Ambient IoT DL and UL:
  - Frame structure, synchronization and timing, random access
  - Numerologies, bandwidths, and multiple access
  - Waveforms and modulations
  - Channel coding
  - Downlink channel/signal aspects
  - Uplink channel/signal aspects
  - Scheduling and timing relationships
  - Study necessary characteristics of carrier-wave waveform for a carrier wave provided externally to the Ambient IoT device, including for interference handling at Ambient IoT UL receiver, and at NR basestation.
  - For Topology 2, no difference in physical layer design from Topology 1.

RAN2-led:
- Study and decide which functions are needed for an Ambient IoT compact protocol stack and lightweight signalling procedure to enable DO-DTT and DT data transmission, and study those functions.
- For example:
  - Paging
  - Random access
  - Data transmission, including necessary radio resource control aspects, respecting the limitation in the General Scope
  - Interactions with upper layers
- For functionalities not listed above, they are studied only if found essential.

. . .

****************************QUOTATION [1] END****************************

In 3GPP RAN1 #116 meeting ([2]R1-2401937), there are some agreements on Ambient IoT:

****************************QUOTATION [2] START****************************

Agreement

For the purpose of the study, RAN1 uses the following terminologies:

Device 1: ~1 μW peak power consumption, has energy storage, initial sampling frequency offset (SFO) up to $10^X$ ppm, neither DL nor UL amplification in the device. The device's UL transmission is backscattered on a carrier wave provided externally.

Device 2a: ≤a few hundred μW peak power consumption, has energy storage, initial sampling frequency offset (SFO) up to $10^X$ ppm, both DL and/or UL amplification in the device. The device's UL transmission is backscattered on a carrier wave provided externally.

Device 2b: ≤a few hundred μW peak power consumption, has energy storage, initial sampling frequency offset (SFO) up to $10^X$ ppm, both DL and/or UL amplification in the device. The device's UL transmission is generated internally by the device.

Agreement

A-IoT DL study includes OOK from DL transmitter's perspective.

For an OFDM waveform, assume OOK-1 for single-chip per OFDM symbol transmission, and OOK-4 for M-chip per OFDM symbol transmission, starting from definitions in TR 38.869.

Agreement

At least the following bandwidths for R2D are defined for the purpose of the study:

Transmission bandwidth, $B_{tx,R2D}$ from a Reader perspective: The frequency resources used for transmitting R2D Occupied bandwidth, $B_{occ,R2D}$ from a Reader perspective: The frequency resources used for transmitting R2D, and potential guard band Agreement From RAN1 perspective, at least when a response is expected from multiple devices that are intended to be identified, an A-IoT contention-based access procedure initiated by the reader is used.

Agreement

For A-IoT contention-based access procedure, at least slotted-ALOHA based access is studied.

Agreement (Amended as Shown in Thursday Session)

For ambient IoT devices, at least for R2D data transmission, a physical channel (PRDCH) is studied, System information (if defined) is transmitted on the PRDCH FFS Whether/how control information is transmitted on the PRDCH Note: the naming of PRDCH is used for the sake of the study Agreement For ambient IoT devices, at least for D2R data transmission, a physical channel (PDRCH) is studied along with the following, Response transmitted from device to reader during contention-based access procedure is transmitted on the PDRCH

*****************************QUOTATION [2] END*****************************

In 3GPP RAN1 #116bis meeting ([3]R1-2403821), there are some agreements on Ambient IoT:

*****************************QUOTATION [3] START*****************************

Agreement

Study time-domain multiple access of D2R transmissions. Further details, including pros/cons, are FFS.

Agreement

Study frequency-domain multiple access of D2R transmissions, at least by utilizing a small frequency-shift in baseband. Further details, including pros/cons, are FFS.

Agreement

The following bandwidths for D2R are defined for the purpose of the study:

Transmission bandwidth, $B_{cx,D2R}$: The frequency resources scheduled by a reader for a D2R transmission from one device.

FFS in agenda 9.4.2.3: how frequency resources scheduled by a reader are determined Occupied bandwidth, $B_{cc,D2R}$: The transmission bandwidth plus the potential associated intra A-IoT guard-bands totaling $B_{guard,D2R}$ Note: this guard band is not for coexistence with NR/LTE Agreement Study D2R transmission in the physical layer using repetition Note: Discussions regarding higher-layer repetitions are up to RAN2.

Agreement

For the reader to acquire the end of PDRCH transmission, study at least following options:

Option 1: D2R postamble immediately follows the PDRCH

Option 2: Based on control information

Agreement

For D2R transmission, study the necessity of midamble at least for the purpose of performing timing/frequency tracking or channel estimation or interference estimation, considering at least the following:

Modulation and Coding schemes, e.g., data modulation, line/channel coding

Receiving methods, e.g., coherent or non-coherent

D2R transmission length/packet size

Midamble overhead

Timing/frequency accuracy

Phase accuracy

Agreement

For D2R, a preamble preceding each PDRCH transmission is studied as the baseline at least for the D2R timing acquisition signal:

Preamble is not part of PDRCH

FFS: Other functionalities of the preamble

*****************************QUOTATION [3] END*****************************

In 3GPP RAN1 #117 meeting ([4] RAN1 Chair's Notes for 3GPP TSG RAN WG1 #117), there are some agreements on Ambient IoT:

*****************************QUOTATION [4] START*****************************

Agreement

Scheduling information of PDRCH transmission is provided by a corresponding PRDCH.

Agreement

For R2D, the only physical channel is PRDCH.

PRDCH carries any higher-layer payload

PRDCH carries L1 R2D control information (if defined)

FFS details of device behaviour(s) for receiving PRDCH

Agreement

For D2R

PDRCH carries any higher-layer payload

PDRCH carries L1 D2R control information (if defined)

Note: PDRCH carries the response agreed at RAN1 #116

*****************************QUOTATION [4] END*****************************

In 3GPP RAN1 #118 meeting ([5] RAN1 Chair's Notes for 3GPP TSG RAN WG1 #118), there are some agreements on Ambient IoT:

*****************************QUOTATION [5] START*****************************

Agreement

The following table is a starting point for the study of M values and the associated minimum $B_{tx,R2D}$ value Reader can use any R2D transmission bandwidth>=minimum $B_{tx,R2D}$ FFS: Impacts, if any, of CP handling solutions, and other impacts Note: depending on further study, the maximum value of M may be less than 32

| M | Minimum $B_{tx, R2D}$ # of PRBs |
|---|---|
| 1 | 1 |
| 2 | 1 |
| 4 | 1 |
| 6 | 1 |
| 8 | 2 |
| 12 | 2 |
| 16 | 2 |
| 24 | 2 |
| 32 | 3 |

Agreement

Study FDMA of D2R transmissions for Msg.1 from multiple devices in response to a R2D transmission triggering random access, including following How the frequency domain resources are allocated for the FDMA of D2R transmissions for Msg.1

How a device determines the frequency domain resource for the D2R transmissions for Msg.1

Agreement

For D2R scheduling, the following information potentially can be explicitly/implicitly indicated to the device via corresponding PRDCH:

Time domain resources

Frequency domain resources

MCS-like information

Chip duration

ID associated with device(s)

Repetitions

FFS: other information

FFS: For each information, whether higher-layer signaling and/or L1 R2D control signaling is used

*****************************QUOTATION [5] END*****************************

In 3GPP RAN1 #118bis meeting ([6] RAN1 Chair's Notes for 3GPP TSG RAN WG1 #118bis), there are some agreements on Ambient IoT:

*****************************QUOTATION [6] START*****************************

Agreement

The TR will capture the following options, and companies are encouraged to analyze the tradeoffs among the following D2R amble(s) options:

Option 1: D2R preamble only

Option 2: D2R preamble+X midamble(s), where X≥1

Option 3: D2R preamble+postamble

Option 4: D2R preamble+Y midamble(s)+postamble, where Y≥1

For the above options, companies are encouraged to report at least the following:

Purpose(s) of the preamble, midamble and postamble

Whether companies assume multiple options can be supported

Agreement

RAN1 studies following:

A R2D transmission triggering random access determines X time domain resource(s) for D2R transmission(s) for Msg1, where each D2R transmission for Msg1 occurs in one time domain resource of the X time domain resource(s).

The study includes

Study X=1 and X>1 and X>=1, the maximum value of X>1 should be set considering the device implementation complexity, device power consumption, the resource usage efficiency affected at least by SFO, and inventory latency.

Size(s) for resource allocation in the time domain

Determination of the X time domain resource(s) by the device

Agreement

Study FDMA and/or TDMA of D2R transmissions for Msg3 from multiple devices in response to a given set of one or multiple Msg2 transmission(s) during access procedure, including following How the frequency and time domain resources are allocated for the FDMA and/or TDMA of D2R transmissions for Msg3

Agreement

RAN1 studies the following options for Msg2 transmission in response to multiple Msg1 transmissions, which is initiated by a R2D transmission triggering random access.

Option 1: A PRDCH for Msg2 transmission corresponds to a A-IoT Msg1 received from one device Option 2: A PRDCH for Msg2 transmission corresponds to multiple A-IoT Msg1 received from different devices

*****************************QUOTATION [6] END*****************************

In 3GPP RAN2 #126 meeting ([7] RAN2 Chair's Notes for 3GPP TSG RAN WG 2 #126), there are some agreements on Ambient IoT:

*****************************QUOTATION [7] START*****************************

| Agreements | |
|---|---|
| 1 | As baseline, the "inventory only" case is supported by the procedure:<br>Step A: A-IoT paging;<br>Step B: Device ID transmission (via Random Access or without using RA). Details are FFS |
| 2 | As baseline, the "inventory and command" case is supported by the procedure:<br>Step A: A-IoT paging;<br>Step B: Device ID transmission (via Random Access or without using RA). Details are FFS<br>Step C: reader to device data transmission (e.g. the R2D command), and<br>Step D: corresponding device to reader data transmission (e.g. the feedback). FFS whether this is optional, pending other WG discussions.<br>Clarify in TR that inventory and command doesn't mean that AIoT paging includes both<br>Inventory and Command in the same message. This doesn't mean<br>that inventory and command are received by the reader at the same time from upper layer. |

| Agreements | |
|---|---|
| 1 | RAN2 will study the following cases for AIoT paging message:<br>a message containing an ID of a single A-IoT device.<br>a message containing a group ID that maps to multiple A-IoT devices.<br>a message that does not contain an ID, i.e., addressed for all devices that can receive the AIoT message. |

-continued

| Agreements |
| --- |
| a message containing multiple IDs of A-IoT devices. Need to confirm the need for this use case based on SA2 discussion. What device ID and group ID and scenarios is depending on SA2 discussion. |
| 2 AIoT paging message indicate information from which the device can determine resources to be used for response (D2R message). FFS how (e.g. implicit/explicit/configured/pre-configured) and what resources (dedicated and/or shared) are provided to the device taking into account RAN1 discussion. |

| Agreements on "4 step" RA | |
| --- | --- |
| 1 | A-IoT Msg1: the device sends an ID to the reader. ID is a random ID generated by device (FFS how it is generated, e.g. randomly generated or generated based on Device ID). FFS on ID size. This doesn't preclude any other RAN1 agreed information |
| 2 | A-IoT Msg2: the reader echoes the ID received in Msg1. Further information may be included in mgs2 based on RAN1 agreements |
| 3 | A-IoT Msg3: device sends Device ID and/or any other upper layer data (depending on upper layer request) |
| 1 | The device considers the contention resolution as successful, if the Msg2 including the same random ID in Msg1 is received. RAN2 assumes the size of random ID in Msg1 should be sufficient for contention resolution purpose. |
| 2 | "Msg4" (i.e. the subsequent R2D transmission after D2R transmission) does not need to be always sent in random access. "Msg4" can be considered to handle the Msg3 transmission failure (due to various reasons). "Msg4" usage/presence can be further discussed. RAN2 will not use "Msg4" term for further discussion of the random access. |

******************************QUOTATION [7] END********************************

In 3GPP RAN2 #127 meeting ([8] RAN2 Chair's Notes for 3GPP TSG RAN WG 2 #127), there are some agreements on Ambient IoT:

******************************QUOTATION [8] START********************************

| Agreements |
| --- |
| For 3-step CBRA Support fixed random ID size is 16 bit. The ID is randomly generated. |
| Failure/success indication of D2R will be studied. FFS if it would be implicit or explicit and for which use case it is needed. |
| FFS whether it is applied only to some cases. |

******************************QUOTATION [8] END********************************

After 3GPP RAN1 #118bis meeting, there are some contributions [9]R1-2407863~[10]R1-2407907 on Ambient IoT access procedure:

******************************QUOTATION [9] START********************************

Although above agreement was made for Msg.1, it is more important to study the FDMA of multiple Msg3 transmissions to improve the inventory efficiency considering the TBS for Msg.3 is larger than Msg.1. Therefore, we propose to extend above agreement to Msg3 as well.

Proposal 4.1-1: Study FDMA of D2R Transmissions for Msg.3 from Multiple Devices in Response to a Msg.2 transmission.

FFS how the frequency domain resources are allocated for the FDMA of D2R transmissions for Msg.3

Regarding the details on the frequency domain resource allocated for a D2R transmission, it can be discussed from the perspective of frequency location and transmission bandwidth.

For the frequency location,

For device 2b with internally generated D2R transmission, it is straightforward to indicate the different FDMed frequency resources for different A-IoT devices for D2R transmissions by R2D control information.

For device 1/2a with D2R backscattered on a CW, different frequency resources for different A-IoT devices can be achieved by allocating different small frequency shifts in R2D control information [6].

For the transmission bandwidth, it is determined by the D2R data rate which can be indicated/determined by the R2D control information.

FDMA of Msg1 Transmissions

The transmission bandwidth for multiple FDMed Msg.1 transmissions should be the same and indicated explicitly or implicitly by a R2D transmission triggering random access. The frequency location for each Msg1 transmission should be different and determined by the parameter related to small frequency shift that is indicated by a R2D transmission triggering random access.

Proposal 4.1-2: Frequency domain resources for FDMA of Msg.1 transmissions in response to a R2D transmission triggering random access is determined/derived from Msg.1 transmission bandwidth and frequency domain transmission location.

Same transmission bandwidth determined by Msg1 data rate is applied to all the FDMed resources for Msg1 transmissions.

Different frequency domain transmission locations indicated by the R2D transmission triggering random access is applied to different FDMed resources for Msg1 transmissions.

Regarding how a device determines the frequency domain resource for the D2R transmissions for Msg.1, generally two options can be considered.

Option 1 is the triggered A-IoT device randomly selects one resource among the FDMed resources indicated/determined by the R2D transmission triggering random access Option 2 is the triggered A-IoT device selects one resource among the FDMed resources based on the predefined rule and/or information indicated by the R2D transmission triggering random access.

E.g., the device selects the resource indexed in ascending order in frequency domain that matches the counter value generated locally at the device side.

Option 1 is simple, while Option 2 may have better control of the collision. Whether/how Option 2 is needed may also depend on RAN2 discussion.

Proposal 4.1-3: For Contention-Based RA, the Triggered A-IoT Device Selects the Resource to be Used for Msg1 Transmission Randomly or Based on Predefined Rule or Information Provided by the Reader Among the FDMed Resources.

FDMA of Msg3 Transmissions

Different from Msg1's contention-based transmission, Msg3 is effectively treated as contention-free or scheduling-based because the device has already been identified by the reader during the contention resolution process in Msg2. Therefore, the frequency domain transmission location should be assigned to each individual device by the parameter related to small frequency shift. Further discussion is needed on whether the transmission bandwidth is the same or can be different for the FDMed resources for Msg3 transmissions in response to a Msg.2 transmission.

Proposal 4.1-4: Frequency Domain Resources for FDMA of Msg3 Transmissions in Response to a Msg2 Transmission is determined/derived from Msg3 transmission bandwidth and frequency domain transmission location.

- At least the frequency domain transmission location should be assigned in device specific manner by the Msg2 transmission.
- FFS transmission bandwidth can be allocated either specifically for each device or commonly across devices.

. . .

Based on the evaluation results and observations, following proposal is made:

Proposal 4.2-1: Study TDMA of D2R Transmissions for Msg.1 from Multiple Devices in Response to a R2D Transmission Triggering Random Access, Including Following:

- How the time domain resources are allocated for the TDMA of D2R transmissions for Msg.1
- How a device determines the time domain resource for the D2R transmissions for Msg.1

About the details on time-domain resource allocation/determination for D2R transmission (e.g., A-IoT Msg1/Msg3), it can be discussed from the perspective of the transmission duration/length and the starting time for a D2R transmission.

For Msg1/Msg3 transmission duration/length, it is decided by the Msg1/Msg3 TBS and Msg1/Msg3 data rate. The Msg1/Msg3 TBS can be a fixed value like 16 or 96 bits respectively and the Msg1/Msg3 data rate can be further derived by the D2R chip length, coding rate and repetition factor if any which can be indicated by the corresponding R2D transmission. In case of TDMA of multiple Msg1/Msg3 transmissions, some gaps in time domain between adjacent Msg1/Msg3 transmission should be reserved to account for the SFO and clock drift. In addition, it is noted that the later the device transmits in the time domain, the greater the uncertainty of its actual transmission duration becomes.

For multiple TDMed Msg1 transmissions triggered by a R2D transmission triggering random access, the starting time for each Msg1 transmission should be different, while other scheduling information such as TBS, chip length, coding rate and repetition factor if any should be the same. However, for multiple TDMed Msg3 transmissions triggered by a A-IoT Msg2 transmission, besides the starting time for each Msg3 transmission is different/independent, further discussion is needed on whether other scheduling information can also be different, as this may have impacts on the Msg2 format design.

Proposal 4.2-2: For TDMA of Msg1 or Msg3 Transmissions from Multiple Devices in Response to a R2D Transmission Triggering Random Access or a A-IoT Msg2, the Time Domain Resource is Determined/Derived by the Msg1/Msg3 Transmission Duration and Starting Time.

- Different transmission starting time provided by the corresponding R2D transmission is applied to the different TDMed resources for Msg1/Msg3 transmission.
- Same transmission duration determined/derived by the TBS, data rate is applied to all the TDMed resources for Msg1 transmission.
- FFS transmission duration can be allocated either specifically for each device or commonly across devices.

****************************QUOTATION [9] END****************************

****************************QUOTATION [10] START******************************

5.3. Msg2 Resource Determination

As discussed in agenda 9.4.2.1, it is hard for R2D transmission from the same Reader to support FDM, therefore, no matter for TDMA or FDMA of Msg1, if multiple Msg2 are to be transmitted, Msg2 transmission should be transmitted in a TDM way. And there two options for Msg2 transmission,

- Option 1: Multiple Msg2 commands and each corresponding to a valid Msg1 For this option, when multiple valid Msg1 is received by the Reader in the same slot, the Reader has to transmit multiple Msg2 in a TDM way.
- Option 2: Single Msg2 commands with multiple information fields and each corresponding to a valid Msg1 For this option, all the devices sending Msg1 in the slot will receive the same Msg2.

For both options, devices can be provided the order of its response among the multiple Msg2 or among the multiple information fields, with this assistance information, devices can save power for Msg2 detection.

Proposal 17: There are Two Options for Msg2 Transmission when TDMA or FDMA of Msg1 in the Same Slot are Supported,

- Option 1: Multiple Msg2 commands and each corresponding to a valid Msg1.
- Option 2: Single Msg2 commands with multiple information fields and each corresponding to a valid Msg1.

Proposal 18: Assistance Information Such as the Transmission Order of Multiple Msg.2 can be Provided to Devices to reduce monitoring complexity.

****************************QUOTATION [10] END****************************

In recent years, more devices are expected to be interconnected in the wireless communication world for improving productivity and efficiency, and for increasing comforts of life. However, powering all the Internet of Things (IoT) devices by battery that needs to be replaced or recharged manually would lead to high maintenance cost, environmental issues, and safety hazards for some use cases, e.g., wireless sensors in electrical power. The further reduction of size, complexity, and power consumption of IoT devices can enable the deployment for various applications (e.g., automated manufacturing, smart home, etc.).

On the other hand, barcode and Radio Frequency Identification (RFID) have a limited reading range of a few meters which usually requires handheld scanning. This would lead to labor intensive and time-consuming operations. Also, the lack of an interference management scheme would result in severe interference between RFID readers and capacity problems, especially in cases of dense deployment. It is hard to support a large-scale network with seamless coverage for RFID. In contrast, a study of ambient IoT investigates the feasibility of a new IoT technology within Third Generation Partnership Project (3GPP) systems.

An Ambient IoT device/User Equipment (UE) would have ultra-low complexity, very small device size, and a long life cycle. The Ambient IoT device/UE would have complexity and power consumption orders of magnitude lower than the existing 3GPP Low-Power Wide-Area (LPWA) technologies (e.g., Narrowband Internet of Things (NB-IoT), enhanced Machine Type Communication (eMTC)). The Ambient IoT device/UE may not have energy storage or may have energy storage. The energy of the Ambient IoT device/UE may be provided through the harvesting of radio waves, light, motion, heat, or any other power source that could be suitable. The energy and/or power source may be provided one-shot (e.g., unexpected or aperiodically), periodically, or continuously. In one embodiment, the power/energy of the Ambient IoT device/UE may be provided from a carrier wave from the network and/or an intermediate node. In Topology 1, the Ambient IoT device/UE would directly and bidirectionally communicate with a base station. In Topology 2, the Ambient IoT device/UE would communicate bidirectionally with an intermediate node (e.g., a UE, a UE reader, or a relay node) between the Ambient IoT device/UE and the base station. The Uplink (UL) transmission of the Ambient IoT device/UE may be generated internally by the device/UE, or be backscattered on the carrier wave provided externally. More details regarding ambient IoT (devices/UEs) could be found in the study item [1] RP-240826 and TR 38.848 ([5] RAN1 Chair's Notes for 3GPP TSG RAN WG1 #118).

According to a study item of ambient IoT ([1] RP-240826), Ambient IoT devices/UEs have limited energy storage (possibly even with no energy storage). Comparing a New Radio (NR) UE with power consumption of mW (e.g., maximum UE transmit power 23 dBm corresponds to 199.5 mW), output power of the Ambient IoT device/UE may be typically from 1 μW to a few hundreds of μW. Currently, the general scope is to address the following types of Ambient IoT UEs:

- A first type of Ambient IoT device/UE may have 1p W peak power consumption, with energy storage, with neither Downlink (DL) nor UL amplification. Transmission from the first type of Ambient IoT device/UE may be backscattered on a carrier wave provided externally. The first type of Ambient IoT device/UE may be a type of device 1, e.g., as described in [2]R1-2401937.
- A second type of Ambient IoT device/UE may have ≤a few hundred μW peak power consumption, with energy storage, with DL and/or UL amplification. Transmission from the second type of Ambient IoT device/UE may be backscattered on a carrier wave provided externally (e.g., a type of Device 2a) or generated internally by the device/UE (e.g., a type of Device 2b). The second type of Ambient IoT device/UE may be a type of Device 2a and/or Device 2b, e.g., as described in [2]R1-2401937.

In RAN2 #126 meeting ([7] RAN2 Chair's Notes for 3GPP TSG RAN WG 2 #126), it is agreed that a 4-step (random) access procedure for Ambient IoT (A-IoT) includes:

- A-IoT Message 1 (Msg1): the device sends an Identity/Identification (ID) to the reader. the ID is a random ID generated by the device (For Further Study (FFS) how it is generated, e.g., randomly generated or generated based on the Device ID).
- A-IoT Message 2 (Msg2): the reader echoes the ID received in Msg1. Further information may be included in mgs2 based on RAN1 agreements.
- A-IoT Message 3 (Msg3): device sends the Device ID and/or any other upper layer data (depending on the upper layer request).
- Message 4 ("Msg4") (i.e., the subsequent Reader-to-Device (R2D) transmission after Device-to-Reader (D2R) transmission) does not need to be always sent in random access. "Msg4" can be considered to handle the Msg3 transmission failure (due to various reasons). "Msg4" usage/presence can be further discussed. RAN2 will not use the "Msg4" term for further discussion of the random access.

Regarding Msg1, it is agreed to study Frequency Division Multiple Access (FDMA) of D2R transmissions for Msg.1 from multiple devices in response to an R2D transmission triggering random access (e.g., [5] RAN1 Chair's Notes for 3GPP TSG RAN WG1 #118), and also study X time domain resource(s) for D2R transmission(s) for Msg1, wherein X=1 and X>1 and X>=1 (e.g., [6] RAN1 Chair's Notes for 3GPP TSG RAN WG1 #118bis). This means that A-IoT can support Time Division Multiple Access (TDMA) and/or FDMA to acquire multiple time-frequency resources for a (random) access procedure. When a reader (e.g., a network node or an intermediate node) initiates a paging round, e.g., via transmitting A-IoT paging message or R2D transmission triggering random access, the A-IoT device can derive/determine corresponding multiple time-frequency resources for D2R transmission(s) for Msg1.

In RAN1 #118bis meeting (e.g., [6] RAN1 Chair's Notes for 3GPP TSG RAN WG1 #118bis), it is agreed to study the starting time and time duration for Msg2 monitoring for Msg2 reception, and also study two options for Msg2 transmission in response to multiple Msg1 transmissions, including:

- Option 1: A Physical Reader (to Ambient IoT) Device Channel (PRDCH) for Msg2 transmission corresponds to a A-IoT Msg1 received from one device, and
- Option 2: A PRDCH for Msg2 transmission corresponds to multiple A-IoT Msg1s received from different devices.

In response to a given set of one or multiple Msg2 transmission(s), FDMA and/or TDMA of D2R transmission for Msg3 from multiple devices can be studied (e.g., [6] RAN1 Chair's Notes for 3GPP TSG RAN WG1 #118bis).

In RAN1 #118bis meeting, some contributions (e.g., [9]R1-2407863 and [10]R1-2407907) provided discussions and proposals on resources for Msg1, Msg2, and Msg3 transmissions.

When an A-IoT device receives an R2D transmission triggering random access, the device may perform a D2R transmission, on a time-frequency resource, for Msg1 including an ID. In response to the Msg1, the device may monitor Msg2 to check whether the reader echoes the ID transmitted in Msg1. Assuming FDMA is not supported in the R2D transmission. If Option 1 is adopted for PRDCH for Msg2 transmission, there will be multiple time occasions for Msg2, which will induce much power consumption and complexity in device monitoring. Even if Option 2 is adopted for PRDCH for Msg2 transmission, there may still be multiple time occasions for Msg2, It is because TDMA can be supported for Msg1 and it is hard for one Msg2 transmission to respond to all Msg is due to the larger Msg2 overhead and lower performance. Thus, considering A-IoT devices would have ultra-low complexity and power consumption, it is important to the shorten time duration for Msg2 monitoring for Msg2 reception.

Moreover, A-IoT considers the procedure for inventory and/or command, as agreed in RAN2 #126 meeting (e.g., [9]R1-2407863). For the inventory only case, the device may need to report its device ID in Msg3. For inventory and command, the device may need to report its device ID and other upper layer data (depending on the upper layer request) in Msg3. The bit-size of the upper layer data may be variable. When a reader initiates paging or random access for multiple devices, it is possible that some devices only need to report its device ID, some devices need to report its device ID and variable upper layer data. If Msg3 resource is larger, it may induce resource waste for some devices. If the Msg3 resource is smaller, some devices cannot report all of their pending data. Thus, there seems to be an issue on how the reader schedules the Msg3 resource.

To deal with above issues and achieve benefits, some concepts, mechanisms, methods, aspects, and embodiments are provided as follows.

Concept A

A reader (e.g., a network node or an intermediate node) may transmit at least a first message to one or multiple (Ambient IoT) devices, e.g., during a paging round, of a (random) access procedure. The first message may be transmitted via one or more first R2D transmissions. Preferably in certain embodiments, the first message may be utilized for initiating a (random) access procedure. Preferably and/or alternatively in certain embodiments, the first message may be utilized for initiating/starting one access round of the (random) access procedure. Preferably in certain embodiments, there may be one or multiple access rounds of the (random) access procedure.

Preferably in certain embodiments, the first message may indicate/schedule one or multiple first access occasions, e.g., for utilization of D2R transmissions for Msg1 from one or multiple devices. Preferably in certain embodiments, the first message may indicate/schedule one or multiple first frequency resources, e.g., for utilization of D2R transmissions for Msg1 from one or multiple devices. Preferably in certain embodiments, the one or multiple first frequency resources may correspond/associate with one or multiple first frequency shifts, respectively. Each of the one or multiple first frequency resources may correspond/be associated with one of the one or multiple first frequency shifts.

Preferably in certain embodiments, a first device may receive/detect the first message. Preferably in certain embodiments, the first device may perform a first D2R transmission to the reader, e.g., in response to the first message. Preferably in certain embodiments, the first device may determine to perform the first D2R transmission in response to at least the first message. Preferably in certain embodiments, the first device may determine to perform/initiate a (random) access procedure in response to at least the first message. Preferably in certain embodiments, the first device may derive/determine a set of first resources based on at least the first message, and perform the first D2R transmission on a first resource among the set of first resources. Preferably in certain embodiments, the set of first resources may mean/be/comprise the one or multiple first frequency resources in the one or multiple first access occasions.

The Concept A is that the set of first resources may be ordered/indexed/numbered, and the first device may monitor corresponding R2D transmissions based on an order/index of the first resource. More specifically, when/after the first device performs the first D2R transmission, e.g., for Msg1, on a first resource, the first device may determine a time duration for monitoring the corresponding R2D transmission(s), e.g., for Msg2, based on the order/index of the first resource.

The Concept A also comprises that in response to receiving a number of first D2R transmissions, e.g., for Msg1, on a number of first resources (among the set of first resources) from one or more devices, the reader may perform/provide corresponding R2D transmissions, e.g., for Msg2, in order based on orders/indices of the number of first resources.

In one embodiment A1, the set of first resources may be ordered/indexed/numbered in order of increasing frequency domain allocation first and then increasing time domain allocation. Preferably in certain embodiments, the set of first resources may be ordered/indexed/numbered in increasing order in a frequency-first manner and then in increasing order in a time manner. Preferably in certain embodiments, each resource of the set of first resources may be represented with a frequency index k and a time index l, respectively. The frequency index k may be ordered/indexed/numbered among the one or multiple first frequency resources. The time index l may be ordered/indexed/numbered among the one or multiple first access occasions. The set of first resources may be ordered/indexed/numbered in increasing order of first the index k and then the index l. For the instances shown in FIGS. 5A, 5B, and 5C, the first message, e.g., the Msg0, may indicate/schedule two access occasions (e.g., each with a time index $l=0_t$ or $1_t$) in time domain and four frequency resources (e.g., each with a frequency index $k=0_f$, $1_f$, $2_f$, or $3_f$) in frequency domain, such that there are 8 first resources in the set of first resources for utilization of D2R transmissions for Msg1 from one or multiple devices. The set of first resources may be ordered/indexed/numbered as:

- A first resource #0 corresponds to resource of Msg1 #$(0_f,0_t)$,
- A first resource #1 corresponds to resource of Msg1 #$(1_f,0_t)$,
- A first resource #2 corresponds to resource of Msg1 #$(2_f,0_t)$,
- A first resource #3 corresponds to resource of Msg1 #$(3_f,0_t)$,
- A first resource #4 corresponds to resource of Msg1 #$(0_f,1_t)$,
- A first resource #5 corresponds to resource of Msg1 #$(1_f,1_t)$,
- A first resource #6 corresponds to resource of Msg1 #$(2_f,1_t)$,
- A first resource #7 corresponds to resource of Msg1 #$(3_f,1_t)$.

In one embodiment A2, the set of first resources may be ordered/indexed/numbered in order of decreasing frequency domain allocation first and then increasing time domain allocation. Preferably in certain embodiments, the set of first resources may be ordered/indexed/numbered in decreasing order in frequency-first manner and then in increasing order in time manner. Preferably in certain embodiments, each resource of the set of first resources may be represented with a frequency index k and a time index l, respectively. The frequency index k may be ordered/indexed/numbered among the one or multiple first frequency resources. The time index l may be ordered/indexed/numbered among the one or multiple first access occasions. The set of first resources may be ordered/indexed/numbered in decreasing order of first the index k and then in increasing order of the index l. For the instances shown in FIGS. 5A, 5B, and 5C, the first message, e.g., the Msg0, may indicate/schedule two access occasions (e.g., each with a time index $l=0_t$ or $1_t$) in time domain and four frequency resources (e.g., each with a frequency index $k=0_f$, $1_f$, $2_f$, or $3_f$) in frequency domain, such that there are 8 first resources in the set of first resources for utilization of D2R transmissions for Msg1 from one or multiple devices. The set of first resources may be ordered/indexed/numbered as:

- A first resource #0 corresponds to resource of Msg1 #$(3_f,0_t)$,
- A first resource #1 corresponds to resource of Msg1 #$(2_f,0_t)$,
- A first resource #2 corresponds to resource of Msg1 #$(1_f,0_t)$,
- A first resource #3 corresponds to resource of Msg1 #$(0_f,0_t)$, A first resource #4 corresponds to resource of Msg1 #($3_f$,$1_t$), A first resource #5 corresponds to resource of Msg1 #($2_f$,$1_t$), A first resource #6 corresponds to resource of Msg1 #($1_f$,$1_t$), A first resource #7 corresponds to resource of Msg1 #($0_f$,$1_t$).

In one embodiment A3, the set of first resources may be ordered/indexed/numbered in order of increasing time domain allocation first and then increasing frequency domain allocation. Preferably in certain embodiments, the set of first resources may be ordered/indexed/numbered in increasing order in time-first manner and then in increasing order in frequency manner. Preferably in certain embodiments, each resource of the set of first resources may be represented with a frequency index k and a time index l, respectively. The frequency index k may be ordered/indexed/numbered among the one or multiple first frequency resources. The time index l may be ordered/indexed/numbered among the one or multiple first access occasions. The set of first resources may be ordered/indexed/numbered in increasing order of first the index l and then the index k. For the instances shown in FIGS. 5A, 5B, and 5C, the first message, e.g., the Msg0, may indicate/schedule two access occasions (e.g., each with a time index l=$0_t$ or $1_t$) in time domain and four frequency resources (e.g., each with a frequency index k=$0_f$, $1_f$, $2_f$, or $3_f$) in frequency domain, such that there are 8 first resources in the set of first resources for utilization of D2R transmissions for Msg1 from one or multiple devices. The set of first resources may be ordered/indexed/numbered as:

A first resource #0 corresponds to resource of Msg1 #($0_f$,$0_t$),

A first resource #1 corresponds to resource of Msg1 #($0_f$,$1_t$),

A first resource #2 corresponds to resource of Msg1 #($1_f$,$0_t$),

A first resource #3 corresponds to resource of Msg1 #($1_f$,$1_t$),

A first resource #4 corresponds to resource of Msg1 #($2_f$,$0_t$),

A first resource #5 corresponds to resource of Msg1 #($2_f$,$1_t$),

A first resource #6 corresponds to resource of Msg1 #($3_f$,$0_t$),

A first resource #7 corresponds to resource of Msg1 #($3_f$,$1_t$).

In one embodiment A4, the set of first resources may be ordered/indexed/numbered in order of increasing time domain allocation first and then decreasing frequency domain allocation. Preferably in certain embodiments, the set of first resources may be ordered/indexed/numbered in increasing order in time-first manner and then in decreasing order in frequency manner. Preferably in certain embodiments, each resource of the set of first resources may be represented with a frequency index k and a time index l, respectively. The frequency index k may be ordered/indexed/numbered among the one or multiple first frequency resources. The time index l may be ordered/indexed/numbered among the one or multiple first access occasions. The set of first resources may be ordered/indexed/numbered in increasing order of first the index l and then in decreasing order of the index k. For the instances shown in FIGS. 5A, 5B, and 5C, the first message, e.g., the Msg0, may indicate/schedule two access occasions (e.g., each with a time index l=$0_t$ or $1_t$) in time domain and four frequency resources (e.g., each with a frequency index k=$0_f$, $1_f$, $2_f$, or $3_f$) in frequency domain, such that there are 8 first resources in the set of first resources for utilization of D2R transmissions for Msg1 from one or multiple devices. The set of first resources may be ordered/indexed/numbered as:

A first resource #0 corresponds to resource of Msg1 #($3_f$,$0_t$),

A first resource #1 corresponds to resource of Msg1 #($3_f$,$1_t$),

A first resource #2 corresponds to resource of Msg1 #($2_f$,$0_t$),

A first resource #3 corresponds to resource of Msg1 #($2_f$,$1_t$),

A first resource #4 corresponds to resource of Msg1 #($1_f$,$0_t$),

A first resource #5 corresponds to resource of Msg1 #($1_f$,$1_t$),

A first resource #6 corresponds to resource of Msg1 #($0_f$,$0_t$),

A first resource #7 corresponds to resource of Msg1 #($0_f$,$1_t$).

In one embodiment A5, the set of first resources may be ordered/indexed/numbered in/based on (part of) a specific order indicated/provided by the reader. The set of first resources may be ordered/indexed/numbered in/based on (part of) a specific order indicated/provided by the first message or by an initial/common R2D transmission from the reader. Preferably in certain embodiments, in response to the reader receiving the number of first D2R transmissions, e.g., for Msg1, on the number of first resources (among the set of first resources) from the one or more devices, the reader may perform/provide the initial/common R2D transmission for providing/indicating another specific order of the number of first resources. Preferably in certain embodiments, the initial/common R2D transmission may be transmitted/performed/provided before the R2D transmissions, e.g., for Msg2, or Msg2 responses corresponding to the number of first D2R transmissions, e.g., for Msg1. Preferably in certain embodiments, the initial/common R2D transmission may be transmitted/performed/provided after the set of first resources or the one or multiple first access occasions. Preferably in certain embodiments, the number of first resources may be ordered/indexed/numbered in/based on the another specific order. Preferably in certain embodiments, the first device may monitor (firstly) the initial/common R2D transmission. Preferably in certain embodiments, when the first device receives the initial/common R2D transmission, the first device may check whether the initial/common R2D transmission or the another specific order indicates/comprises the first resource. Preferably in certain embodiments, if the initial/common R2D transmission or the another specific order does not indicate/comprise the first resource, the first device may consider contention resolution as a failure and/or stop monitoring (following/afterward) time duration(s) for monitoring corresponding R2D transmission(s), e.g., for Msg2, or corresponding Msg2 response(s) (in the access procedure triggered by the first message). Preferably in certain embodiments, if the initial/common R2D transmission or the another specific order indicates/comprises the first resource, and/or when the first device receives the initial/common R2D transmission, the first device may monitor the corresponding R2D transmission based on an order/index of the first resource among the another specific order of the number of first resources. More specifically, when/after the first device performs the first D2R transmission, e.g., for Msg1, on a first resource, the first device may determine a time duration for monitoring corresponding R2D transmission(s), e.g., for Msg2, based on the order/index of the first resource among the another specific order. Preferably in certain embodiments, the specific order of/in frequency shift may be specified, fixed, or (pre-)configured, and/or indicated from the first message. For the instances shown in FIG. 5C, the first message, e.g., the Msg0, may indicate/schedule two access occasions (e.g., each with a time index $l=0_t$ or $1_t$) in time domain and four frequency resources (e.g., each with a frequency index $k=0_f$, $1_f$, $2_f$, or $3_f$) in frequency domain, such that there are 8 first resources in the set of first resources for utilization of D2R transmissions for Msg1 from one or multiple devices. The reader may perform the initial/common R2D transmission, as Msg2 #1, for providing/indicating the another the specific order of the number of first resources, such as resources for Msg1 #($0_f 0_t$), #($2_f 0_t$), #($3_f 1_t$), #($1_f 1_t$).

Figure 5A:
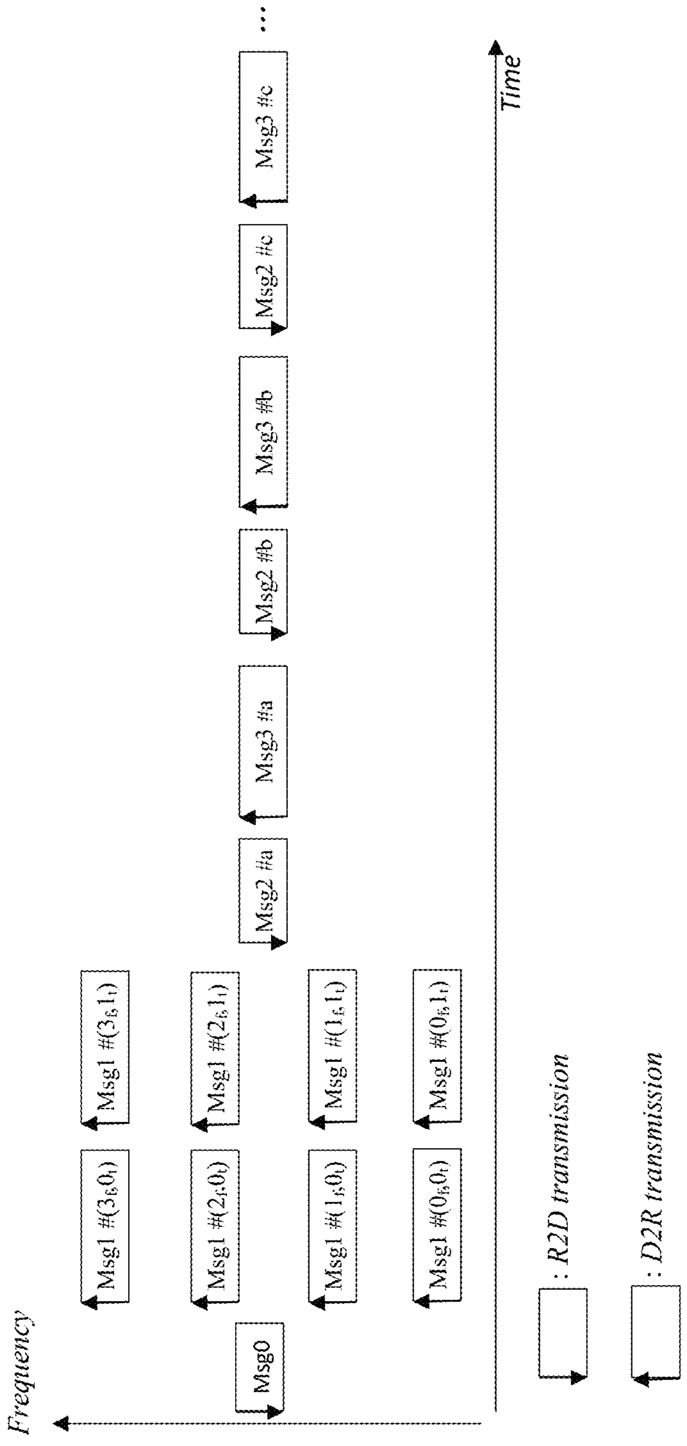
FIGS. 5A-5C are example diagrams showing a first message, e.g., the Msg0, may indicate/schedule two access occasions (e.g., each with a time index l=$0_t$ or $1_t$) in time domain and four frequency resources (e.g., each with a frequency index k=$0_f$, $1_f$, $2_f$, or $3_f$) in frequency domain, such that there are 8 first resources in the set of first resources for utilization of D2R transmissions for Msg1 from one or multiple devices, in accordance with embodiments of the present invention.
Figure 5B:
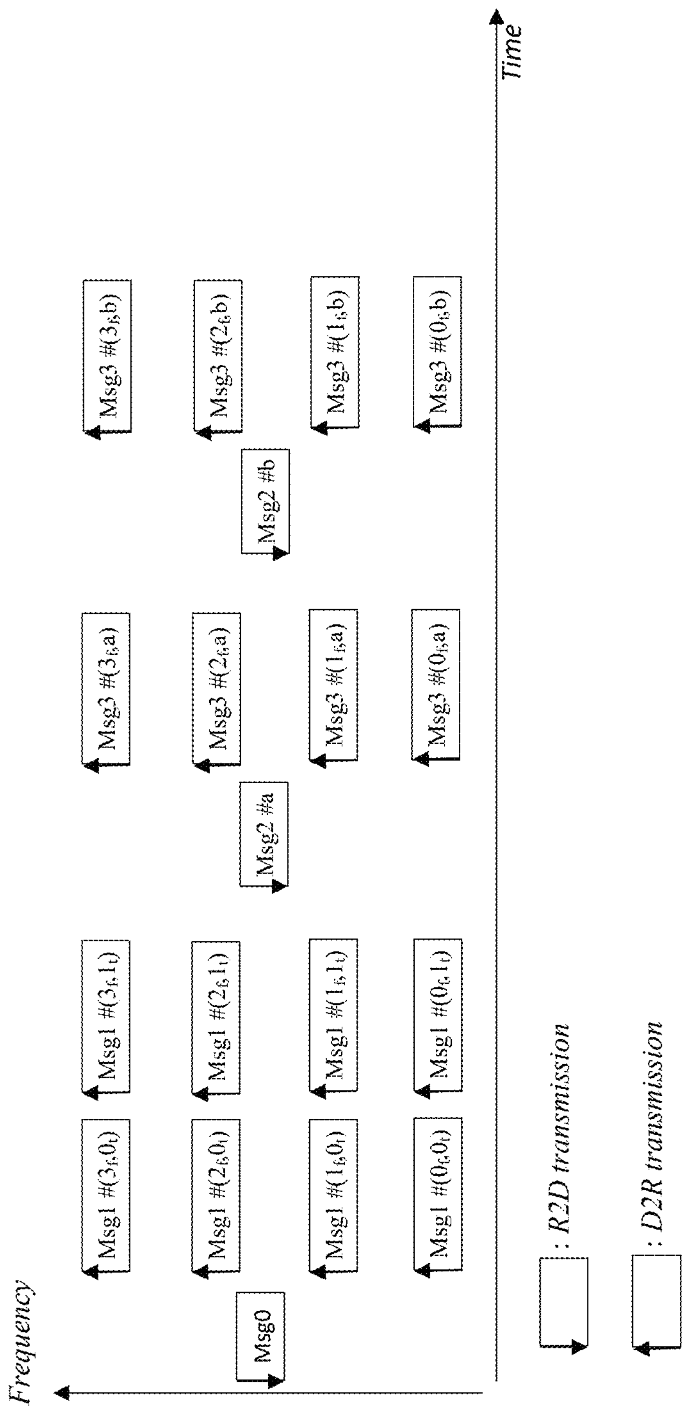
Figure 5C:
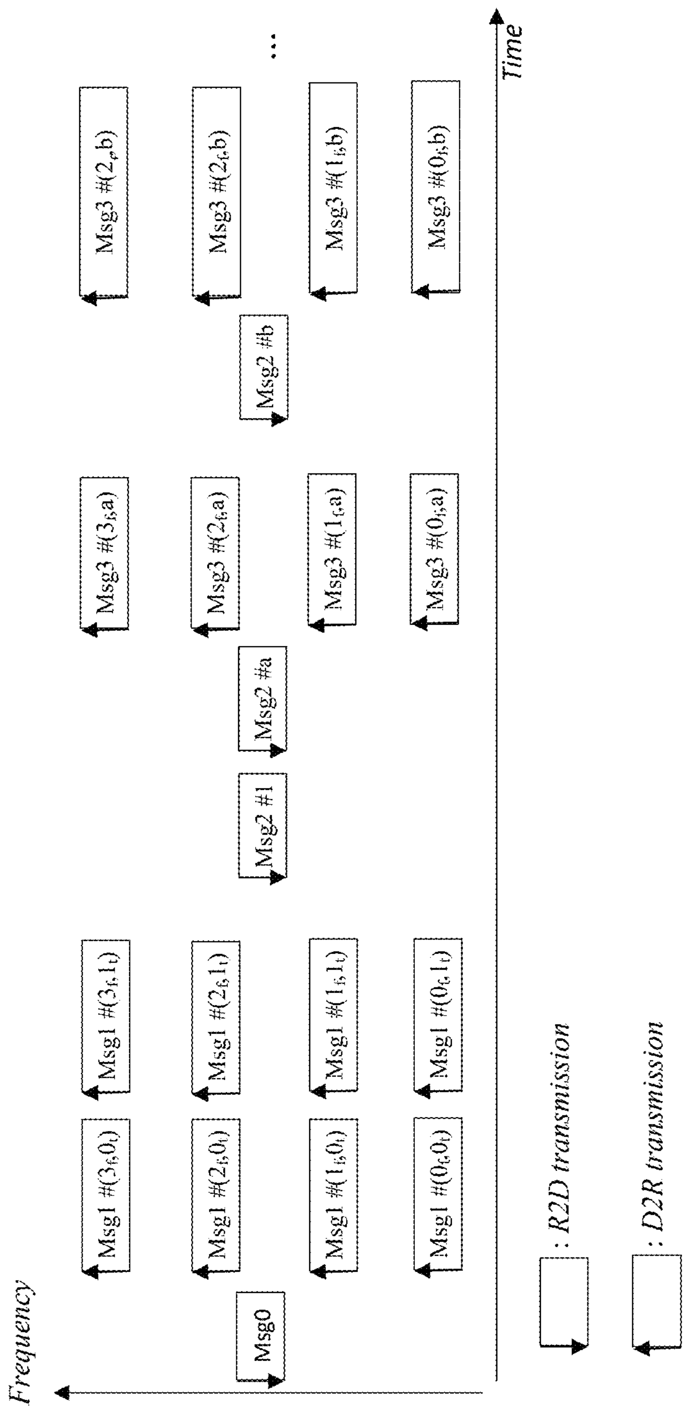

Preferably in certain embodiments, index #in embodiment A1-A5 and/or the FIGS. 5A, 5B, and 5C may be started from #0 as described above.

Preferably and/or alternatively in certain embodiments, index #in embodiment A1-A5 and/or the FIGS. 5A, 5B, and 5C may be started from #1. In this case, index #0~#n as described above may be replaced/represented/changed to index #1-#(n+1), e.g., #0~3 as described above may be replaced/represented/changed to #1~4.

Preferably in certain embodiments, for any of embodiment A1~A4, in response to the reader receiving the number of first D2R transmissions, e.g., for Msg1, on the number of first resources (among the set of first resources) from the one or more devices, the reader may perform/provide an initial/common R2D transmission for providing/indicating the number of first resources. Preferably in certain embodiments, the initial/common R2D transmission may be transmitted/performed/provided before the R2D transmissions, e.g., for Msg2, or Msg2 responses corresponding to the number of first D2R transmissions, e.g., for Msg1. Preferably in certain embodiments, the initial/common R2D transmission may be transmitted/performed/provided after the set of first resources or the one or multiple first access occasions. Preferably in certain embodiments, the number of first resources may be ordered/indexed/numbered based on any embodiments A1-A10 as described for the set of first resources. Preferably in certain embodiments, "the set of first resources may be ordered/indexed/numbered in order . . . " may be represented/replaced/changed as "the number of first resources may be ordered/indexed/numbered in order . . . ". Preferably in certain embodiments, the first device may monitor (firstly) the initial/common R2D transmission. Preferably in certain embodiments, when the first device receives the initial/common R2D transmission, the first device may check whether the initial/common R2D transmission indicates/comprises the first resource. Preferably in certain embodiments, if the initial/common R2D transmission does not indicate/comprise the first resource, the first device may consider contention resolution as failure and/or stop monitoring (following/afterward) time duration(s) for monitoring corresponding R2D transmission(s), e.g., for Msg2, or corresponding Msg2 response(s) (in the access procedure triggered by the first message). Preferably in certain embodiments, if the initial/common R2D transmission indicates/comprises the first resource, and/or when the first device receives the initial/common R2D transmission, the first device may monitor corresponding R2D transmissions based on an order/index of the first resource among the number of first resources.

Preferably in certain embodiments, an R2D transmission (for Msg2) may correspond to one or multiple Msg1s received from different devices.

In response to receive the number of first D2R transmissions on the number of first resources (among the set of first resources) from one or more devices, the reader may provide/perform (the number of Msg2 responses in) one or multiple R2D transmissions, e.g., for Msg2. One R2D transmission may comprise/include one or more Msg2 responses for one or more first D2R transmissions on one or more first resources. Preferably in certain embodiments, each of the one or multiple R2D transmissions (for Msg2) corresponds to one or more of the number of first D2R transmissions on the number of first resources, (respectively). Preferably in certain embodiments, different R2D transmissions (for Msg2) may correspond to different non-overlapped one or more of the number of first D2R transmissions on the number of first resources. Preferably in certain embodiments, each of the one or multiple R2D transmissions (for Msg2) is associated with one or more of the number of first resources, (respectively). Preferably in certain embodiments, different R2D transmissions (for Msg2) may be associated with different non-overlapped one or more of the number of first resources. Preferably in certain embodiments, the reader may provide/perform the one or multiple R2D transmissions or the number of Msg2 responses in/based on the order of increasing order/index of the number of (associated) first resources. Preferably in certain embodiments, the reader may provide/perform the one or multiple R2D transmissions separately in different transmitting timings, wherein the contents (e.g., including which Msg2 responses, or including Msg2 responses associated with which first resources or which first D2R transmissions) of the one or multiple R2D transmissions are determined or derived in/based on the order of increasing order/index of the number of (associated) first resources. Preferably in certain embodiments, the reader may provide/perform the one or multiple R2D transmissions separately in different transmitting timings, wherein the number of Msg2 responses are put/included into the one or multiple R2D transmissions in/based on the order of increasing order/index of the number of (associated) first resources. Preferably in certain embodiments, a Msg2 response associated with a smaller order/index of a first resource may be put/included in an early R2D transmission or in the same R2D transmission compared with another Msg2 response associated with a larger order/index of another first resource.

Preferably in certain embodiments, the number of received first D2R transmissions or the number of first resources may be smaller than or equal to a number of the set of first resources. Preferably in certain embodiments, the number of the one or multiple R2D transmissions, e.g., for Msg2, or the number of Msg2 responses may be smaller than or equal to the number of the set of first resources. Preferably in certain embodiments, the number of the one or multiple R2D transmissions, e.g., for Msg2, may be smaller than the number of received first D2R transmissions or the number of first resources. Preferably in certain embodiments, the number of Msg2 response may be equal/identical to the number of received first D2R transmissions or the number of first resources. Preferably in certain embodiments, if the reader does not receive/detect the D2R transmission in another first resource, the reader does not perform/provide the R2D transmission or Msg2 response in response to the another first resource.

Preferably in certain embodiments, one Msg2 response associated with one first D2R transmission on one first resource may indicate/provide/comprise information of the associated one first resource (among the set of first resources). Preferably in certain embodiments, one Msg2 response associated with one first D2R transmission on one first resource may indicate/provide/comprise information of the order/index of associated one first resource (among the set of first resources).

Preferably in certain embodiments, one R2D transmission, e.g., for Msg2, or one Msg2 response associated with one first D2R transmission on one first resource may indicate/provide/comprise information of the next one R2D transmission, e.g., information of the next one first resource (among the set of first resources) or one Msg2 response associated with the next one R2D transmission. Preferably in certain embodiments, one R2D transmission, e.g., for Msg2, associated with one first D2R transmission on one first resource may indicate/provide/comprise information of the order/index of next one R2D transmission or the next one Msg2 response, e.g., information of the order/index of the next one first resource (among the set of first resource) associated with the next one R2D transmission.

Preferably in certain embodiments, when/after the first device performs the first D2R transmission, e.g., for Msg1, on the first resource, the first device may monitor one or more time durations for monitoring corresponding R2D transmission(s), e.g., for Msg2.

Preferably in certain embodiments, when the first device receives/detects a R2D transmission comprising one or more Msg2 responses (all) indicative of the orders/indices value smaller than the order/index of the first resource, the first device may monitor the next time duration for monitoring corresponding R2D transmission(s) or Msg2 response(s). Preferably in certain embodiments, when the first device receives/detects a R2D transmission comprising one or more Msg2 responses, wherein the one or more Msg2 responses are all associated with the smaller orders/indices values than the order/index of the first resource, the first device may monitor the next time duration for monitoring the corresponding R2D transmission(s) or Msg2 response(s).

Preferably in certain embodiments, when the first device receives/detects an R2D transmission comprising a Msg2 response indicative an order/index value the same as the order/index of the first resource, the first device may receive the R2D transmission or the Msg2 Response and check whether the R2D transmission or the Msg2 Response comprises/echoes/feedbacks any information comprised in the first D2R transmission, e.g., an ID included in the first D2R transmission. Preferably in certain embodiments, the first device may stop monitoring (following/afterward) time duration(s) for monitoring the corresponding R2D transmission(s), e.g., for Msg2, or corresponding Msg2 response(s) (in the access procedure triggered by the first message). Preferably in certain embodiments, if the Msg2 Response comprises/echoes/feedbacks any information comprised in the first D2R transmission, the first device may consider the contention resolution as successful. Preferably in certain embodiments, if the Msg2 Response does not comprise/echo/feedback any information comprised in the first D2R transmission, the first device may consider the contention resolution as failure.

Preferably in certain embodiments, when the first device receives/detects an R2D transmission comprising one or more Msg2 responses (all) indicative of the orders/indices value larger than the order/index of the first resource, the first device may consider the contention resolution as a failure and/or stop monitoring (following/afterward) time duration(s) for monitoring corresponding R2D transmission(s), e.g., for Msg2, or corresponding Msg2 response(s) (in the access procedure triggered by the first message). Preferably in certain embodiments, when the first device receives/detects an R2D transmission comprising one or more Msg2 responses, wherein the one or more Msg2 responses are all associated with larger orders/indices values than the order/index of the first resource, the first device may consider the contention resolution as a failure and/or stop monitoring (following/afterward) time duration(s) for monitoring the corresponding R2D transmission(s), e.g., for Msg2, or corresponding Msg2 response(s) (in the access procedure triggered by the first message).

For the instance as shown in FIG. 5B, there are 8 first resources in the set of first resources for utilization of D2R transmissions for Msg1 from one or multiple devices. The set of first resources may be ordered/indexed/numbered based on any of the embodiments A1~A5. If the reader receives 5 D2R transmissions for Msg1 in 5 first resources #2, #3, #5, #6, #7, respectively, the reader shall perform/provide 5 Msg2 responses corresponding to the 5 D2R transmissions for Msg1 in the 5 first resources, respectively. Based on the increasing order/index of the 5 first resources, the reader may put/include the 5 Msg2 responses into R2D transmissions for Msg2 #a and #b. In an instance, the R2D transmission for Msg2 #a may comprise 3 Msg2 responses corresponding to D2R transmissions for Msg1 in first resources #2, #3, #5, and the R2D transmission for Msg2 #b may comprise 2 Msg2 responses corresponding to D2R transmissions for Msg1 in first resources #6, #7. In an instance, the R2D transmission for Msg2 #a may comprise 2 Msg2 responses corresponding to D2R transmissions for Msg1 in first resources #2, #3, and the R2D transmission for Msg2 #b may comprise 3 Msg2 responses corresponding to D2R transmissions for Msg1 in first resources #5, #6, #7.

If the first device performs its first D2R transmission on first resource #5, the first device may monitor a 1st time duration for monitoring Msg2 and receives/detects R2D transmission for Msg2 #a comprising Msg2 responses corresponding to Msg1 in first resources #2 and #3. Then, the first device may monitor a 2nd time duration for monitoring Msg2 and receives/detects R2D transmission for Msg2 #b comprising at least a Msg2 response corresponding to Msg1 in first resource #5. The first device may check whether the Msg2 response corresponding to Msg1 in first resource #5 comprises/echoes/feedbacks any information comprised in its first D2R transmission. The first device may stop monitoring following/afterward time duration(s), if any, for monitoring Msg2 in the access procedure.

If the first device performs its first D2R transmission on first resource #1, the first device may monitor a 1st time duration for monitoring Msg2 and receives/detects R2D transmission for Msg2 #a comprising Msg2 responses corresponding to Msg1 in first resource #2 and #3. Then, the first device may consider contention resolution as a failure The first device may stop monitoring a 2nd time duration and following/afterward time duration(s), if any, for monitoring Msg2 in the access procedure.

Throughout the Concept A, the term "in order" may be referred to or be replaced by "sequentially".

Concept B

A reader (e.g., a network node or an intermediate node) may transmit at least a first message to one or multiple (Ambient IoT) devices, e.g., during a paging round, of a (random) access procedure. The first message may be transmitted via one or more first R2D transmissions. Preferably in certain embodiments, the first message may be utilized for initiating the (random) access procedure. Preferably and/or alternatively in certain embodiments, the first message may be utilized for initiating/starting one access round of the (random) access procedure. Preferably in certain embodiments, there may be one or multiple access rounds of the (random) access procedure.

Preferably in certain embodiments, the first message may indicate/schedule one or multiple first access occasions, e.g., for utilization of D2R transmissions for Msg1 from one or multiple devices. Preferably in certain embodiments, the first message may indicate/schedule one or multiple first frequency resources, e.g., for utilization of D2R transmissions for Msg1 from one or multiple devices. Preferably in certain embodiments, the one or multiple first frequency resources may correspond/associate with one or multiple first frequency shifts, respectively. Each of the one or multiple first frequency resources may correspond/associated with one of the one or multiple first frequency shifts.

Preferably in certain embodiments, a first device may receive/detect the first message. Preferably in certain embodiments, the first device may perform a first D2R transmission to the reader, e.g., in response to the first message. Preferably in certain embodiments, the first device may determine to perform the first D2R transmission in response to at least the first message. Preferably in certain embodiments, the first device may determine to perform/initiate a (random) access procedure in response to at least the first message. Preferably in certain embodiments, the first device may derive/determine a set of first resources based on at least the first message, and perform the first D2R transmission on a first resource among the set of first resources. Preferably in certain embodiments, the set of first resources may mean/be/comprise the one or multiple first frequency resources in the one or multiple first access occasions.

Preferably in certain embodiments, the reader may receive a number of first D2R transmissions, e.g., for Msg1, on a number of first resources (among the set of first resources) from one or more devices, the reader may perform/provide a number of Msg2 responses corresponding to the number of first D2R transmissions on the number of first resources. Preferably in certain embodiments, the reader may perform/provide one or multiple R2D transmissions for comprising the number of Msg2 responses.

Preferably in certain embodiments, one R2D transmission may comprise/include (only) one Msg2 response for one first D2R transmission on one first resource. Preferably in certain embodiments, the reader may perform/provide the number of R2D transmissions for comprising the number of Msg2 responses. Preferably in certain embodiments, each of the number of R2D transmissions (for Msg2) corresponds to each of the number of first D2R transmissions on the number of first resources, respectively. Preferably in certain embodiments, each of the number of R2D transmission (for Msg2) is associated with each of the number of first resources, respectively. Preferably in certain embodiments, the reader may provide/perform the number of R2D transmissions or the number of Msg2 responses as described in Concept A.

Preferably and/or alternatively in certain embodiments, one R2D transmission may comprise/include one or more Msg2 responses for one or more first D2R transmissions on one or more first resources. Preferably in certain embodiments, one R2D transmission may comprise/include one Msg2 response for one or more first D2R transmissions on one or more first resources. Preferably in certain embodiments, each of the one or multiple R2D transmissions (for Msg2) corresponds to one or more of the number of first D2R transmissions on the number of first resources, (respectively). Preferably in certain embodiments, different R2D transmissions (for Msg2) may correspond to different non-overlapped one or more of the number of first D2R transmissions on the number of first resources. Preferably in certain embodiments, each of the one or multiple R2D transmissions (for Msg2) is associated with one or more of the number of first resources, (respectively). Preferably in certain embodiments, the reader may provide/perform the one or multiple R2D transmissions or the number of Msg2 responses as described in Concept A.

Preferably in certain embodiments, when the first device receives a first R2D transmission or a first Msg2 response corresponding to the first D2R transmissions on the first resource, the first device may perform/provide a second D2R transmission, e.g., for Msg3, on a second resource. The first device may transmit/provide a data packet in the second D2R transmission. Preferably in certain embodiments, the first device may not transmit/provide other data packets, except the data packet, in the second D2R transmission.

In one embodiment B2, (bit-)size of the data packet may be a (bit-)size scheduled/indicated based on the first message. The first device may determine/derive the (bit-)size based on the first message. The first device may determine/derive the (bit-)size based on one or more information of/in the first message. The one or more information of/in the first message may comprise any of paging cause, device type, service/session type/indication, and/or size indication (e.g., Transport Block Size (TBS) or Modulation and Coding Scheme (MCS)). Preferably in certain embodiments, different one or more information of/in the first message may be associated/mapped to different (bit-)sizes. Preferably in certain embodiments, different device types may be associated/mapped to different (bit-)sizes. Preferably in certain embodiments, different service/session type/indication may be associated/mapped to different (bit-)sizes. Preferably in certain embodiments, different paging causes may be associated/mapped to different (bit-)sizes. Preferably in certain embodiments, the first device may determine/derive the (bit-)size not based on the first R2D transmission or the first Msg2 response. Preferably and/or alternatively in certain embodiments, the first device may determine/derive the (bit-)size based on the first message and the first R2D transmission (e.g., the first R2D transmission comprises size indication, TBS or MCS for the second D2R transmission). Preferably and/or alternatively in certain embodiments, the first device may determine/derive the (bit-)size based on the first message and the first Msg2 response (e.g., first Msg2 response comprises size indication, TBS or MCS for the second D2R transmission).

Preferably in certain embodiments, the second D2R transmission is for transmitting/including the scheduled/indicated/determined/derived (bit-)size of the data packet.

Preferably in certain embodiments, if/when the (bit-)size of pending data of the first device is larger than the scheduled/indicated/determined/derived (bit-)size of the data packet, the first device may prioritize some kinds of data, among the pending data, to be transmitted/included in the second D2R transmission or the data packet. Preferably in certain embodiments, if/when (bit-)size of pending data of the first device is larger than the scheduled/indicated/determined/derived (bit-)size of the data packet, the first device may trigger/generate a report, e.g., buffer size/status report, to be transmitted/included in the second D2R transmission or the data packet. Preferably in certain embodiments, the some kinds of data may comprise at least any of an (part of) identity of the first device, the buffer size/status report, and information of one or more services/sessions (type) operated/supported by the first device, and/or power/energy status reports/indications. Preferably in certain embodiments, non-prioritized kinds of data may comprise a measurement report, higher-layer data of one or more services/sessions operated/supported by the first device. Preferably in certain embodiments, the first device may generate the data packet based on a specified/fixed order among possible/supported kinds of data. The first device may put part of the pending data into the data packet based on the specified/fixed order. For instance, the (part of) identity of the first device may be put first/prioritized over the measurement report and/or higher-layer data of one or more services/sessions operated/supported by the first device. The (part of) identity of the first device may be put first/prioritized over the the buffer size/status report. The buffer size/status report may be put first/prioritized over the measurement report and/or higher-layer data of one or more services/sessions operated/supported by the first device. The buffer size/status report may be put first/prioritized over the information of one or more service/session (type) operated/supported by the first device. The information of one or more services/sessions (type) operated/supported by the first device may be put first/prioritized over the measurement report and/or higher-layer data of one or more services/sessions operated/supported by the first device. The information of one or more services/sessions (type) operated/supported by the first device may be put first/prioritized over the power/energy status report/indication. The power/energy status report/indication may be put first/prioritized over the measurement report and/or higher-layer data of one or more services/sessions operated/supported by the first device. Alternatively in certain embodiments, the measurement report and/or higher-layer data of one or more services/sessions operated/supported by the first device may be put first/prioritized over the power/energy status report/indication.

Preferably in certain embodiments, if/when the (bit-)size of pending data of the first device is smaller than or equal to the scheduled/indicated/determined/derived (bit-)size of the data packet, the second D2R transmission or the data packet may comprise all pending data of the first device. The first device may not trigger/generate a report, e.g., buffer size/status report, to be transmitted/included in the second D2R transmission or the data packet. Preferably in certain embodiments, if/when (bit-)size of pending data of the first device is smaller than the scheduled/indicated/determined/derived (bit-)size of the data packet, the second D2R transmission or the data packet may comprise all pending data of the first device and some padding bit(s). Preferably and/or alternatively in certain embodiments, if/when (bit-)size of pending data of the first device is smaller than the scheduled/indicated/determined/derived (bit-)size of the data packet, the second D2R transmission or the data packet may comprise all pending data of the first device and/or indication/information of (bit-)size of all pending data of the first device (without padding bits). The second D2R transmission or the data packet may comprise all pending data of the first device and/or the indication/information of (bit-)size, except the padding bit(s), of the data packet.

In one embodiment B3, (bit-)size of the data packet may be determined/derived based on a size indication, e.g., TBS or MCS, in the first R2D transmission or the first Msg2 response. The first device may determine/derive the (bit-)size based on the first R2D transmission or the first Msg2 response. Preferably in certain embodiments, the first device may determine/derive the (bit-)size not based on the first message. Preferably and/or alternatively in certain embodiments, the first device may determine/derive the (bit-)size based on the first R2D transmission (e.g., the first R2D transmission comprises size indication, TBS or MCS for the second D2R transmission) and (one or more information of/in) the first message. Preferably and/or alternatively in certain embodiments, the first device may determine/derive the (bit-)size based on the first Msg2 response (e.g., first Msg2 response comprises size indication, TBS or MCS for the second D2R transmission) and (one or more information of/in) the first message. The one or more information of/in the first message may comprise any of paging cause, device type, service/session type/indication.

Preferably in certain embodiments, the reader may provide the number of Msg2 responses such that the corresponding second D2R transmissions, e.g., Msg3, in a same transmission occasion shall be associated with the same (bit-)size of data packet comprised in the corresponding second D2R transmissions. Preferably in certain embodiments, the reader may provide the number of Msg2 responses such that the corresponding second D2R transmissions, e.g., Msg3, in a same transmission occasion shall not be associated with different (bit-)size of data packet comprised in the corresponding second D2R transmissions.

Preferably in certain embodiments, the first device may expect that other second D2R transmission(s), e.g., Msg3, from other device(s) in a same transmission occasion as the second D2R transmission shall be associated with the same (bit-)size of data packet as the data packet in the second D2R transmission from the first device. Preferably in certain embodiments, the first device may expect that other second D2R transmission(s), e.g., Msg3, from other device(s) in a same transmission occasion as the second D2R transmission shall not be associated with a different (bit-)size of data packet as the data packet in the second D2R transmission from the first device.

Preferably in certain embodiments, the reader may perform/provide at least a first set of Msg2 response(s) and/or a second set of Msg2 response(s) among the number of Msg2 responses. Preferably in certain embodiments, the first set of Msg2 response(s) are utilized for scheduling a first set of second D2R transmission(s), e.g., for Msg3, from a first set of device(s) (respectively or separately). Preferably in certain embodiments, each of the first set of Msg2 response(s) is utilized for scheduling each of the first set of second D2R transmission(s), e.g., for Msg3. Preferably in certain embodiments, the first set of Msg2 response(s) may comprise the same first size indication. Preferably in certain embodiments, the first set of Msg2 response(s) may schedule/indicate the same first (bit-)size of the data packet. Preferably in certain embodiments, the second set of Msg2 response(s) are utilized for scheduling a second set of second D2R transmission(s), e.g., for Msg3, from a second set of device(s) (respectively or separately). Preferably in certain embodiments, each of the second set of Msg2 response(s) is utilized for scheduling each of the second set of second D2R transmission(s), e.g., for Msg3. Preferably in certain embodiments, the second set of Msg2 response(s) may comprise the same second size indication. Preferably in certain embodiments, the second set of Msg2 response(s) may schedule/indicate the same second (bit-)size of the data packet.

Preferably in certain embodiments, the first set of second D2R transmission(s) may be scheduled/assigned/indicated in one or more first transmission occasions. Preferably in certain embodiments, the second set of second D2R transmission(s) may be scheduled/assigned/indicated in one or more second transmission occasions. Preferably in certain embodiments, the one or more first transmission occasions are non-overlapped with the one or more second transmission occasions.

Preferably in certain embodiments, the first size indication is different from the second size indication. Preferably in certain embodiments, the first (bit-)size of the data packet is different from the second (bit-)size of the data packet. Preferably in certain embodiments, size difference between the first (bit-)size of the data packet and the second (bit-)size of the data packet may be (restricted/limited) larger than a size threshold. The size threshold may be specified, fixed, or (pre-)configured.

As instance shown in FIG. 5C, the first set of second D2R transmission(s) may be the resource of Msg3 #($0_f$,$a_t$), Msg3 #($1_f$,$a_t$), Msg3 #($2_f$,$a_t$), and Msg3 #($3_f$,$a_t$). The second set of second D2R transmission(s) may be the resource of Msg3 #($0_f$,$b_t$), Msg3 #($1_f$,$b_t$), Msg3 #($2_f$,$b_t$), and Msg3 #($3_f$,$b_t$). The first (bit-)size of the data packet may be smaller than the second (bit-)size of the data packet. The resource length/size of the Msg3 #($0_f$,$a_t$), Msg3 #($1_f$,$a_t$), Msg3 #($2_f$,$a_t$), and Msg3 #($3_f$,$a_t$) may be smaller than the resource length/size of the Msg3 #($0_f$,$b_t$), Msg3 #($1_f$,$b_t$), Msg3 #($2_f$,$b_t$), and Msg3 #($3_f$,$b_t$).

Various examples and embodiments of the present invention are described below. For the methods, alternatives, concepts, examples, and embodiments detailed above and herein, the following aspects and embodiments are possible.

Note that any of above concepts, methods, alternatives, instances, and embodiments (e.g., in concept A, B) may be combined or applied simultaneously, in whole or in part.

Throughout the present disclosure, the first message may comprise one, more or no ID(s) for one or more devices/UEs to trigger a (random) access procedure. The first message may indicate the one or more devices/UEs to trigger the (random) access procedure.

Throughout the present disclosure, the first message may mean/be (A-IoT) paging message.

Throughout the present disclosure, the first message may mean/be (A-IoT) R2D round trigger. Preferably in certain embodiments, the first message may mean/be (A-IoT) R2D (transmission) trigger.

Throughout the present disclosure, the first D2R transmission may mean/be (A-IoT) Msg1. Preferably in certain embodiments, the first D2R transmission may be utilized for transmitting (A-IoT) Msg1.

Throughout the present disclosure, the (A-IoT) Msg1 may be or comprise at least a device ID.

Throughout the present disclosure, the Msg2 response may be replaced/changed/represented as Msg2 message, Random Access Response, or response corresponding to Msg1.

Throughout the present disclosure, the "A-IoT paging message" and/or the "first message" may be utilized for initiating, triggering, and/or indicating the (random) access procedure, e.g., for one or more devices. The "A-IoT paging message" and/or the "first message" may be transmitted by the reader (e.g., an intermediate node, a UE) and/or a network. The "A-IoT paging message" and/or the "first message" may be received by one or more (ambient IoT) UEs and/or devices. The first message may be or comprise an A-IoT paging message.

Preferably in certain embodiments, the Ambient IoT-related operation may be/comprise any of an access procedure, contention-based access procedure, contention-free access procedure, inventory procedure/operation, and/or communication procedure/operation (for ambient IoT UEs/devices).

Preferably in certain embodiments, the intermediate node may be/mean a relay, Integrated Access and Backhaul (IAB) node, repeater which is capable of Ambient IoT. Preferably in certain embodiments, the intermediate node be/mean a UE reader or a UE/device capable of Ambient IoT. Preferably in certain embodiments, the intermediate node may be/mean or replaced as an intermediate device. Preferably in certain embodiments, the intermediate node may access or connect to the network node.

Preferably in certain embodiments, the (random) access procedure is utilized for Ambient IoT devices/UEs.

Preferably in certain embodiments, the device/UE may access or connect to the network/intermediate node via the access procedure. Preferably in certain embodiments, the device/UE may perform (data or control) transmission(s) and reception(s) with the network/intermediate node via the access procedure. The access procedure may comprise a (data or control) communication operation. Alternatively and/or preferably in certain embodiments, the access procedure may not comprise a (data or control) communication operation. Preferably in certain embodiments, the (data or control) communication operation may be/comprise (at least) transmission(s) and/or reception(s) between the device/UE and the network/intermediate node. The device/UE may perform the (data or control) communication operation comprising (at least) receiving a valid (R2D) response associated with a first (D2R) signal/transmission, transmitting a device/UE information after receiving the valid (R2D) response, receiving a specific indication/signaling, transmitting D2R data/signal transmission(s), and/or receiving R2D data/signal transmission(s).

Preferably in certain embodiments, the access procedure may be/mean (or include) an inventory procedure. Preferably in certain embodiments, the access procedure may be performed for inventory.

Preferably in certain embodiments, the one or more first control information and/or first command(s) may be transmitted via PRDCH. Preferably in certain embodiments, the one or more first control information and/or first command (s) may comprise/indicate an identity associated with the UE/device.

Preferably in certain embodiments, the R2D transmission bandwidth may be/mean (or include) frequency resources used for performing R2D transmission/reception. Preferably and/or alternatively in certain embodiments, the network/intermediate node may perform one PRDCH (restricted to be) within one R2D transmission bandwidth. Preferably in certain embodiments, the network/intermediate node may not perform (or prevent from performing) one PRDCH across multiple R2D transmission bandwidths. Preferably in certain embodiments, a R2D transmission bandwidth may be/mean/be replaced by any of a (R2D) bandwidth part or a (R2D) sub-channel or a (R2D) frequency unit.

Preferably in certain embodiments, the D2R transmission bandwidth may be/mean (or include) frequency resources used for performing D2R transmission/reception. Preferably and/or alternatively in certain embodiments, the network/intermediate node may perform one PDRCH (restricted to be) within one D2R transmission bandwidth. Preferably in certain embodiments, the network/intermediate node may not perform (or prevent from performing) one Physical (Ambient IoT) Device (to) Reader Channel (PDRCH) across multiple D2R frequency bandwidths. Preferably in certain embodiments, a D2R transmission bandwidth may be/mean or replaced by any of a (D2R) bandwidth part or a (D2R) sub-channel or a (D2R) frequency unit.

Preferably in certain embodiments, the D2R may be/mean or replaced/changed/represented as from the device/UE to the reader/network/intermediate node. Preferably in certain embodiments, the D2R may be/mean or replaced/changed/represented as UL.

Preferably in certain embodiments, the R2D may be/mean or replaced/changed/represented as from the reader/network/intermediate node to the device/UE. Preferably in certain embodiments, the R2D may be/mean or replaced/changed/represented as DL.

Preferably in certain embodiments, the PDRCH may be/mean or replaced/changed/represented as a channel/transmission from the device/UE to the reader/network/intermediate node. Preferably in certain embodiments, the PDRCH may be replaced by "physical channel for D2R (data and/or control) transmission".

Preferably in certain embodiments, the PRDCH may be/mean or replaced/changed/represented as a channel/transmission from the reader/network/intermediate node to the device/UE. Preferably in certain embodiments, the PRDCH may be replaced by "physical channel for R2D (data and/or control) transmission".

Preferably in certain embodiments, the occasion/timing/Transmission Time Interval (TTI) may be/mean or replaced/changed/represented as a slot. Preferably in certain embodiments, the occasion/timing/TTI may be/mean or replaced/changed/represented as a subframe. Preferably in certain embodiments, the occasion/timing/TTI may be/mean or replaced/changed/represented as a sub-slot or mini-slot. Preferably in certain embodiments, the occasion/timing/TTI may comprise a number (e.g., a predefined/fixed/(pre-)configured or indicated number) of symbols in time domain.

Preferably in certain embodiments, the occasion/timing/TTI may be/mean or replaced/changed/represented as a transmission occasion. Preferably in certain embodiments, the occasion/timing/TTI may be/mean or replaced/changed/represented as a reception occasion.

Preferably in certain embodiments, the device/UE may perform D2R transmission via backscatter on the carrier wave (signal), e.g., provided externally or via generated internally by the device/UE.

The UE/device may receive carrier wave(s) from a reader. The UE/device may receive carrier wave(s) from anode other than the reader.

Throughout the present disclosure, the Backscattering (BS) may be replaced by "Device to Reader (D2R)" or "UL". The backscattering transmission may be, be referred to, and/or be supplemented by a transmission from a device to a reader and/or a D2R transmission, e.g., PDRCH.

The UE may be referred to the UE, a Radio Resource Control (RRC) layer of the UE, a Medium Access Control (MAC) entity of the UE, or a physical layer of the UE.

The device may be referred to the device, an RRC layer of the device, a MAC entity of the device, or a physical layer of the device.

The UE may not be a legacy UE. The legacy UE may be a non-Ambient IoT device. The legacy UE may perform different procedures from the Ambient IoT UE. The UE may be a legacy UE with capability to perform an Ambient IoT procedure.

The network may be a network node. The network may be a base station. The network may be an access point. The network may be an evolved Node B (eNB). The network may be an NR Node B (gNB). The network may be a gateway. The network may be an interrogator.

Various examples and embodiments of the present invention are described below. For the methods, alternatives, concepts, examples, and embodiments detailed above and herein, the following aspects and embodiments are possible.

Figure 6:
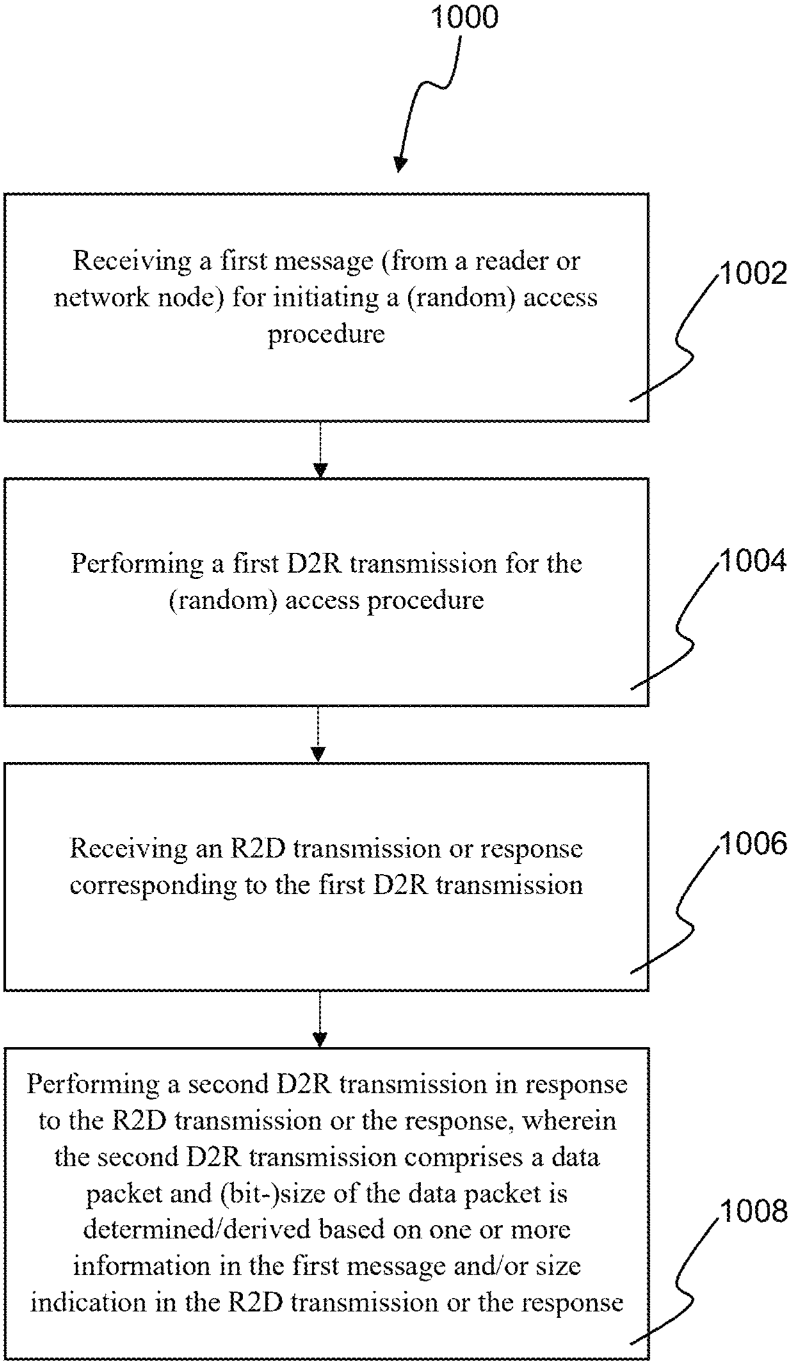
FIG. 6 is a flow diagram of a method of a first device in a wireless communication system comprising receiving a first message (from a reader or network node) for initiating a (random) access procedure, performing a first D2R transmission for the (random) access procedure, receiving an R2D transmission or response corresponding to the first D2R transmission, and performing a second D2R transmission in response to the R2D transmission or the response, in accordance with embodiments of the present invention.

Referring to FIG. 6, with this and other concepts, systems, and methods of the present invention, a method 1000 for a first device in a wireless communication system comprises receiving a first message (from a reader or network node) for initiating a (random) access procedure (step 1002), performing a first D2R transmission for the (random) access procedure (step 1004), receiving an R2D transmission or response corresponding to the first D2R transmission (step 1006), and performing a second D2R transmission in response to the R2D transmission or the response, wherein the second D2R transmission comprises a data packet and (bit-)size of the data packet is determined/derived based on one or more information in the first message and/or size indication in the R2D transmission or the response (step 1008).

In various embodiments, the one or more information in the first message comprises any of paging cause, device type, service/session type/indication, and/or size indication (e.g., TBS or MCS).

In various embodiments, if/when (bit-)size of pending data of the first device is larger than the determined/derived (bit-)size of the data packet, the first device prioritizes some kinds of data, among the pending data, to be transmitted/included in the second D2R transmission or the data packet, and/or if/when (bit-)size of pending data of the first device is larger than the determined/derived (bit-)size of the data packet, the first device triggers/generates a report, e.g., buffer size/status report, to be transmitted/included in the second D2R transmission or the data packet.

In various embodiments, the some kinds of data comprises at least any of a (part of) identity of the first device, the buffer size/status report, and information of one or more service/session (type) operated/supported by the first device, and/or power/energy status report/indication.

In various embodiments, the first device puts part of pending data into the data packet based on a specified/fixed order.

In various embodiments, if/when (bit-)size of pending data of the first device is smaller than the determined/derived (bit-)size of the data packet, the second D2R transmission or the data packet comprises all pending data of the first device and some padding bit(s), or if/when (bit-)size of pending data of the first device is smaller than the determined/derived (bit-)size of the data packet, the second D2R transmission or the data packet comprises all pending data of the first device without padding bits and/or indication/information of (bit-)size of all pending data of the first device, and/or if/when (bit-)size of pending data of the first device is smaller than the determined/derived (bit-)size of the data packet, the first device does not trigger/generate a report, e.g., buffer size/status report, to be transmitted/included in the second D2R transmission or the data packet.

Referring back to FIGS. 3 and 4, in one or more embodiments from the perspective of a device in a wireless communication system, the device 300 includes a program code 312 stored in memory 310 of the transmitter. The CPU 308 could execute program code 312 to: (i) receive a first message (from a reader or network node) for initiating a (random) access procedure; (ii) perform a first D2R transmission for the (random) access procedure; (iii) receive an R2D transmission or response corresponding to the first D2R transmission; and (iv) perform a second D2R transmission in response to the R2D transmission or the response, wherein the second D2R transmission comprises a data packet and (bit-)size of the data packet is determined/derived based on one or more information in the first message and/or size indication in the R2D transmission or the response. Moreover, the CPU 308 can execute the program code 312 to perform all of the described actions, steps, and methods described above, below, or otherwise herein.

Referring back to FIGS. 3 and 4, in one or more embodiments from the perspective of a reader or a network node in a wireless communication system, the device 300 includes a program code 312 stored in memory 310 of the transmitter. The CPU 308 could execute program code 312 to: (i) transmit a first message (to a device) for initiating a (random) access procedure; (ii) receive a first D2R transmission for the (random) access procedure; (iii) transmit, to a device, an R2D transmission or response corresponding to the first D2R transmission; and (iv) receive a second D2R transmission in response to the R2D transmission or the response, wherein the second D2R transmission comprises a data packet and (bit-)size of the data packet is determined/derived based on one or more information in the first message and/or size indication in the R2D transmission or the response. Moreover, the CPU 308 can execute the program code 312 to perform all of the described actions, steps, and methods described above, below, or otherwise herein.

Figure 7:
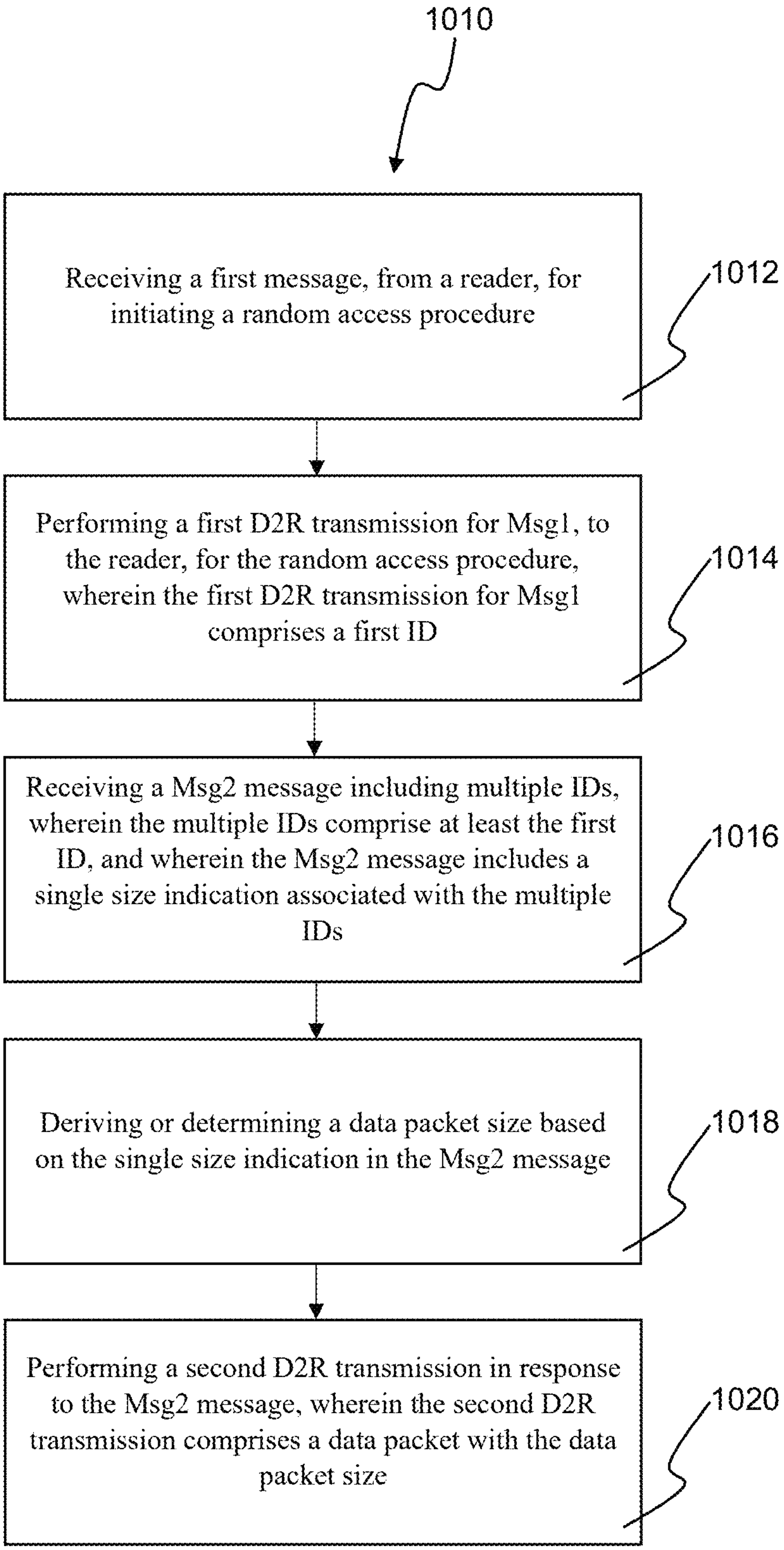
FIG. 7 is a flow diagram of a method of a first device in a wireless communication system comprising receiving a first message, from a reader, for initiating a random access procedure, performing a first D2R transmission for Msg1, to the reader, for the random access procedure, receiving a Msg2 message including multiple IDs, deriving or determining a data packet size based on the single size indication in the Msg2 message, and performing a second D2R transmission in response to the Msg2 message, in accordance with embodiments of the present invention.

Referring to FIG. 7, with this and other concepts, systems, and methods of the present invention, a method 1010 for a first device in a wireless communication system comprises receiving a first message, from a reader, for initiating a random access procedure (step 1012), performing a first D2R transmission for Msg1, to the reader, for the random access procedure, wherein the first D2R transmission for Msg1 comprises a first ID (step 1014), receiving a Msg2 message including multiple IDs, wherein the multiple IDs comprise at least the first ID, and wherein the Msg2 message includes a single size indication associated with the multiple IDs (step 1016), deriving or determining a data packet size based on the single size indication in the Msg2 message (step 1018), and performing a second D2R transmission in response to the Msg2 message, wherein the second D2R transmission comprises a data packet with the data packet size (step 1020).

In various embodiments, the Msg2 message including the multiple IDs schedules or triggers multiple D2R transmissions (from multiple devices), and/or each of the multiple D2R transmissions comprises one data packet with a same data packet size derived or determined based on the single size indication in the Msg2 message.

In various embodiments, the multiple D2R transmissions are in a same transmission occasion.

In various embodiments, the single size indication is a single field of a D2R transport block size.

In various embodiments, the first message is a (A-IoT) paging message, and/or the random access procedure is a contention-based random access procedure.

In various embodiments, the data packet with the data packet size means bit-size or byte-size of the data packet being equal to the data packet size.

In various embodiments, Msg1 is or means a D2R message including the first ID. The first transmission for Msg1 is or means a first D2R transmission comprising a D2R message which includes the first ID. The first ID is a random ID generated by the first device.

In various embodiments, the Msg2 message is or means an R2D message for at least including the multiple IDs.

Referring back to FIGS. 3 and 4, in one or more embodiments from the perspective of a device in a wireless communication system, the device 300 includes a program code 312 stored in memory 310 of the transmitter. The CPU 308 could execute program code 312 to: (i) receive a first message, from a network node or reader, for initiating a random access procedure; (ii) perform a first D2R transmission for Msg1, to the network node or reader, for the random access procedure, wherein the first D2R transmission for Msg1 comprises a first ID; (iii) receive a Msg2 message including multiple IDs, wherein the multiple IDs comprise at least the first ID, and wherein the Msg2 message includes a single size indication associated with the multiple IDs; (iv) derive or determine a data packet size based on the single size indication in the Msg2 message; (v) and perform a second D2R transmission in response to the Msg2 message, wherein the second D2R transmission comprises a data packet with the data packet size. Moreover, the CPU 308 can execute the program code 312 to perform all of the described actions, steps, and methods described above, below, or otherwise herein.

Figure 8:
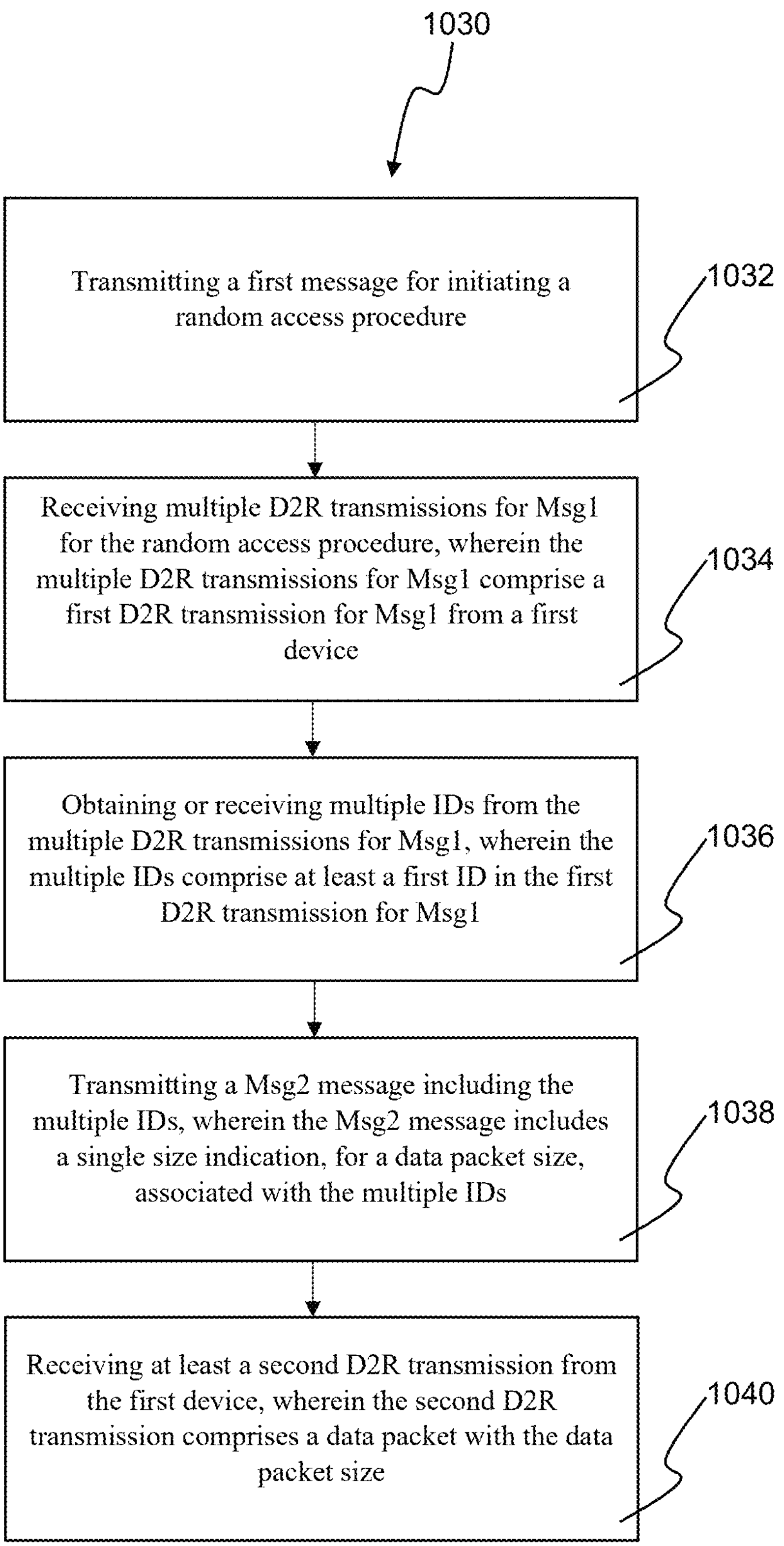
FIG. 8 is a flow diagram of a method of a reader in a wireless communication system comprising transmitting a first message for initiating a random access procedure, receiving multiple D2R transmissions for Msg1 for the random access procedure, obtaining or receiving multiple IDs from the multiple D2R transmissions for Msg1, transmitting a Msg2 message including the multiple IDs, and receiving at least a second D2R transmission from the first device, in accordance with embodiments of the present invention.

Referring to FIG. 8, with this and other concepts, systems, and methods of the present invention, a method 1030 for a reader in a wireless communication system comprises transmitting a first message for initiating a random access procedure (step 1032), receiving multiple D2R transmissions for Msg1 for the random access procedure, wherein the multiple D2R transmissions for Msg1 comprise a first D2R transmission for Msg1 from a first device (step 1034), obtaining or receiving multiple IDs from the multiple D2R transmissions for Msg1, wherein the multiple IDs comprise at least a first ID in the first D2R transmission for Msg1 (step 1036), transmitting a Msg2 message including the multiple IDs, wherein the Msg2 message includes a single size indication, for a data packet size, associated with the multiple IDs (step 1038), and receiving at least a second D2R transmission from the first device, wherein the second D2R transmission comprises a data packet with the data packet size (step 1040).

In various embodiments, the Msg2 message including the multiple IDs schedules or triggers multiple D2R transmissions (from multiple devices), and/or each of the multiple D2R transmissions comprises one data packet with a same data packet size.

In various embodiments, the multiple D2R transmissions are in a same transmission occasion.

In various embodiments, each of the multiple D2R transmissions for Msg1 comprises one of the multiple IDs, and/or wherein the multiple D2R transmissions for Msg1 are transmitted by multiple devices.

In various embodiments, the single size indication is a single field of a D2R transport block size.

In various embodiments, the first message is a (A-IoT) paging message, and/or the random access procedure is a contention-based random access procedure.

In various embodiments, the data packet with the data packet size means bit-size or byte-size of the data packet being equal to the data packet size.

In various embodiments, Msg1 is or means a D2R message including a ID. The first D2R transmission for Msg1 is or means the first D2R transmission comprising a D2R message which includes the first ID. The first ID is a random ID generated by the first device. Each of the multiple D2R transmissions for Msg1 comprise a D2R message which includes one of the multiple IDs.

In various embodiments, the Msg2 message is or means a R2D message for at least including the multiple IDs.

In various embodiments, the reader is a network node, a UE reader, or an intermediate node.

Referring back to FIGS. 3 and 4, in one or more embodiments from the perspective of a reader or network node in a wireless communication system, the device 300 includes a program code 312 stored in memory 310 of the transmitter. The CPU 308 could execute program code 312 to: (i) transmit a first message for initiating a random access procedure; (ii) receive multiple D2R transmissions for Msg1 for the random access procedure, wherein the multiple D2R transmissions for Msg1 comprise a first D2R transmission for Msg1 from a first device; (iii) obtain or receive multiple IDs from the multiple D2R transmissions for Msg1, wherein the multiple IDs comprise at least a first ID in the first D2R transmission for Msg1; (iv) transmit a Msg2 message including the multiple IDs, wherein the Msg2 message includes a single size indication, for a data packet size, associated with the multiple IDs; and (v) receive at least a second D2R transmission from the first device, wherein the second D2R transmission comprises a data packet with the data packet size. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a first device, comprising:

receiving a first message, from a reader, for initiating a random access procedure;

performing a first Device-to-Reader (D2R) transmission for Message 1 (Msg1), to the reader, for the random access procedure, wherein the first D2R transmission for Msg1 comprises a first random Identity (ID) generated by the first device;

receiving a Message 2 (Msg2) message including multiple random IDs, wherein the multiple random IDs are indicated from multiple D2R transmissions for Msg1 transmitted by multiple devices and the multiple random IDs comprise at least the first random ID, and wherein the Msg2 message includes a single field of D2R transport block size indication associated with the multiple random IDs;

deriving or determining a data packet size based on the single field of D2R transport block size indication in the Msg2 message; and performing a second D2R transmission in response to the Msg2 message, wherein the second D2R transmission comprises a data packet with the data packet size.

2. The method of claim 1, wherein the Msg2 message including the multiple random IDs schedules or triggers multiple D2R transmissions, and/or each of the multiple D2R transmissions comprises one data packet with a same data packet size derived or determined based on the single field of D2R transport block size indication in the Msg2 message.

3. The method of claim 2, wherein the multiple D2R transmissions are in a same transmission occasion.

4. The method of claim 1, wherein each of the multiple D2R transmissions for Msg1 indicates one of the multiple random IDs, and/or the multiple D2R transmissions for Msg1 comprises the first D2R transmission for Msg1.

5. The method of claim 1, wherein the first message is a paging message, and/or the random access procedure is a contention-based random access procedure.

6. A method for a reader, comprising:

transmitting a first message for initiating a random access procedure;

receiving multiple Device-to-Reader (D2R) transmissions for Message 1 (Msg1) for the random access procedure, wherein the multiple D2R transmissions for Msg1 comprise a first D2R transmission for Msg1 from a first device;

obtaining or receiving multiple random Identities (IDs) from the multiple D2R transmissions for Msg1, wherein the multiple random IDs comprise at least a first random ID in the first D2R transmission for Msg1;

transmitting a Message 2 (Msg2) message including the multiple random IDs, wherein the Msg2 message includes a single field of D2R transport block size indication, for a data packet size, associated with the multiple random IDs; and receiving at least a second D2R transmission from the first device, wherein the second D2R transmission comprises a data packet with the data packet size.

7. The method of claim 6, wherein the Msg2 message including the multiple random IDs schedules or triggers multiple D2R transmissions, and/or each of the multiple D2R transmissions comprises one data packet with a same data packet size.

8. The method of claim 7, wherein the multiple D2R transmissions are in a same transmission occasion.

9. The method of claim 6, wherein each of the multiple D2R transmissions for Msg1 comprises one of the multiple random IDs, and/or wherein the multiple D2R transmissions for Msg1 are transmitted by multiple devices.

10. The method of claim 6, wherein the first message is a paging message, and/or the random access procedure is a contention-based random access procedure.

11. The method of claim 1, wherein the multiple random IDs are obtained from multiple D2R transmissions for Msg1 transmitted by multiple devices.

12. A first device, comprising:

a memory; and a processor operatively coupled with the memory, wherein the processor is configured to execute a program code to:

receive a first message, from a reader, for initiating a random access procedure;

perform a first Device-to-Reader (D2R) transmission for Message 1 (Msg1), to the reader, for the random access procedure, wherein the first D2R transmission for Msg1 comprises a first random Identity (ID) generated by the first device;

receive a Message 2 (Msg2) message including multiple random IDs, wherein the multiple random IDs are indicated from multiple D2R transmissions for Msg1 and the multiple random IDs comprise at least the first random ID, and wherein the Msg2 message includes a single field of D2R transport block size indication associated with the multiple random IDs;

derive or determine a data packet size based on the single field of D2R transport block size indication in the Msg2 message; and perform a second D2R transmission in response to the Msg2 message, wherein the second D2R transmission comprises a data packet with the data packet size.

13. The first device of claim 12, wherein each of the multiple D2R transmissions for Msg1 indicates one of the multiple random IDs, and/or wherein the multiple D2R transmissions for Msg1 are transmitted by multiple devices and/or the multiple D2R transmissions for Msg1 comprises the first D2R transmission for Msg1.

14. The first device of claim 12, wherein the Msg2 message including the multiple random IDs schedules or triggers multiple D2R transmissions, and/or each of the multiple D2R transmissions comprises one data packet with a same data packet size derived or determined based on the single field of D2R transport block size indication in the Msg2 message.

* * * * *